United States Patent
Meier et al.

(10) Patent No.: US 11,859,982 B2
(45) Date of Patent: *Jan. 2, 2024

(54) SYSTEM FOR DETERMINING POSITION BOTH INDOOR AND OUTDOOR

(71) Applicant: Apple Inc., Cupertino, CA (US)

(72) Inventors: Peter Meier, Los Gatos, CA (US); Christian Lipski, Cupertino, CA (US)

(73) Assignee: Apple Inc., Cupertino, CA (US)

(*) Notice: Subject to any disclaimer, the term of this patent is extended or adjusted under 35 U.S.C. 154(b) by 114 days.

This patent is subject to a terminal disclaimer.

(21) Appl. No.: 16/938,559

(22) Filed: Jul. 24, 2020

(65) Prior Publication Data

US 2020/0355504 A1 Nov. 12, 2020

Related U.S. Application Data

(63) Continuation of application No. 15/695,780, filed on Sep. 5, 2017, now Pat. No. 10,739,142.

(Continued)

(51) Int. Cl.
*G01C 21/20* (2006.01)
*H04W 4/33* (2018.01)
(Continued)

(52) U.S. Cl.
CPC ............ *G01C 21/206* (2013.01); *G01C 21/20* (2013.01); *G05D 1/0231* (2013.01); *G06V 20/10* (2022.01); *G06V 20/36* (2022.01); *H04W 4/33* (2018.02)

(58) Field of Classification Search
CPC ....... G01C 21/206; G01C 21/20; H04W 4/33; G06V 20/36; G06V 20/10; G05D 1/0231

(Continued)

(56) References Cited

U.S. PATENT DOCUMENTS 4,700,307 A 10/1987 Mons
7,023,536 B2 4/2006 Zhang
(Continued)

FOREIGN PATENT DOCUMENTS

CN 1846232 A 10/2006
CN 101004748 A 7/2007
(Continued)

OTHER PUBLICATIONS

Akbarzadeh, A., et al., "Towards Urban 3D Reconstruction from Video," 3D Data Processing, Visualization, and Transmission, Jun. 1, 2006, pp. 1-8.

(Continued)

*Primary Examiner* — Mahmoud S Ismail
(74) *Attorney, Agent, or Firm* — Blank Rome LLP

(57) ABSTRACT

An apparatus, method, and computer readable medium related to determining the position of a device, for example determining the pose of a camera. Varying embodiments discuss the use of sensors and captured images to construct an environment property map, which provides reference information in the form of environment properties that are associated with positions, such as camera poses. Embodiments of the disclosure discuss using the environment property map online (e.g. in real time) in order to determine the position of a device. In some embodiments, the environment property map provides a coarse position that is used to refine or limit the necessary work for determining a more precise position.

20 Claims, 12 Drawing Sheets

Related U.S. Application Data

(60) Provisional application No. 62/382,869, filed on Sep. 2, 2016.

(51) Int. Cl.
*G05D 1/02* (2020.01)
*G06V 20/10* (2022.01)
*G06V 20/00* (2022.01)

(58) Field of Classification Search
USPC .................................................. 701/410
See application file for complete search history.

(56) References Cited

U.S. PATENT DOCUMENTS

| | | | |
|---|---|---|---|
| 7,038,846 B2 | 5/2006 | Mandella | |
| 7,088,440 B2 | 8/2006 | Buermann | |
| 7,110,100 B2 | 9/2006 | Buermann | |
| 7,113,270 B2 | 9/2006 | Buermann | |
| 7,161,664 B2 | 1/2007 | Buermann | |
| 7,203,384 B2 | 4/2007 | Carl | |
| 7,268,956 B2 | 9/2007 | Mandella | |
| 7,474,809 B2 | 1/2009 | Carl | |
| 7,729,515 B2 | 6/2010 | Mandella | |
| 7,768,534 B2 | 8/2010 | Pentenrieder | |
| 7,826,641 B2 | 11/2010 | Mandella | |
| 7,889,193 B2 | 2/2011 | Platonov | |
| 7,961,909 B2 | 6/2011 | Mandella | |
| 8,005,261 B2 | 8/2011 | Baur | |
| 8,837,779 B2 | 9/2014 | Meier | |
| 8,942,418 B2 | 1/2015 | Kurz | |
| 9,140,555 B1 | 9/2015 | Andersson | |
| 9,536,351 B1* | 1/2017 | Côté | G06F 3/011 |
| 2002/0010694 A1* | 1/2002 | Navab | G06F 16/29 |
| 2003/0025714 A1 | 2/2003 | Ebersole | |
| 2004/0090444 A1 | 5/2004 | Satoh | |
| 2004/0267682 A1 | 12/2004 | Baur | |
| 2005/0168437 A1 | 8/2005 | Carl | |
| 2005/0231419 A1 | 10/2005 | Mitchell | |
| 2006/0120568 A1 | 6/2006 | McConville | |
| 2006/0165293 A1 | 7/2006 | Hamanaka | |
| 2007/0018975 A1 | 1/2007 | Chuanggui | |
| 2007/0110338 A1 | 5/2007 | Snavely | |
| 2008/0056535 A1 | 3/2008 | Bergmann | |
| 2008/0109184 A1 | 5/2008 | Aratani | |
| 2008/0284864 A1 | 11/2008 | Kotake | |
| 2009/0041340 A1 | 2/2009 | Suzuki | |
| 2009/0185746 A1 | 7/2009 | Mian | |
| 2009/0190798 A1 | 7/2009 | Lee | |
| 2009/0324026 A1 | 12/2009 | Kletter | |
| 2010/0208941 A1 | 8/2010 | Broaddus | |
| 2010/0259546 A1 | 10/2010 | Yomdin | |
| 2010/0329513 A1* | 12/2010 | Klefenz | G06V 10/48 |
| | | | 348/148 |
| 2011/0010033 A1* | 1/2011 | Asahara | G05D 1/024 |
| | | | 901/1 |
| 2011/0227915 A1 | 9/2011 | Mandella | |
| 2012/0038549 A1 | 2/2012 | Mandella | |
| 2012/0195471 A1 | 8/2012 | Newcombe | |
| 2012/0237085 A1* | 9/2012 | Meier | G06V 10/40 |
| | | | 382/103 |
| 2013/0113936 A1 | 5/2013 | Cohen | |
| 2013/0194418 A1 | 8/2013 | Gonzalez-Banos | |
| 2013/0195362 A1 | 8/2013 | Janky | |
| 2013/0297205 A1* | 11/2013 | Kim | G01C 21/206 |
| | | | 701/523 |
| 2014/0254874 A1 | 9/2014 | Kurz | |
| 2015/0237481 A1 | 8/2015 | Ben-Moshe | |
| 2017/0124396 A1* | 5/2017 | Todeschini | G01C 15/00 |
| 2017/0178360 A1* | 6/2017 | Baggen | G06F 1/1694 |
| 2017/0347006 A1* | 11/2017 | Ryan | H04B 10/1149 |
| 2019/0137633 A1* | 5/2019 | Gowda | G01S 19/54 |

FOREIGN PATENT DOCUMENTS

| | | |
|---|---|---|
| CN | 101109818 A | 1/2008 |
| CN | 101138007 A | 3/2008 |
| CN | 101159014 A | 4/2008 |
| CN | 101162524 A | 4/2008 |
| CN | 101262830 A | 9/2008 |
| CN | 101285686 A | 10/2008 |
| DE | 10145608 B4 | 1/2006 |
| DE | 102005064952 A1 | 6/2007 |
| DE | 102006055893 A1 | 5/2008 |
| DE | 202006020299 U1 | 5/2008 |
| EP | 1544795 A1 | 6/2005 |
| EP | 2751742 A1 | 7/2014 |
| JP | H06230115 A | 8/1994 |
| JP | 2003344018 A | 12/2003 |
| JP | 2005141655 A | 6/2005 |
| JP | 2007207251 A | 8/2007 |
| JP | 2008116373 A | 5/2008 |
| WO | 2008080606 A1 | 7/2008 |
| WO | 2009047335 A1 | 4/2009 |

OTHER PUBLICATIONS

AR Wikitude, http://www.mobilizy.com/wikitude.php retrieved from the internet on May 23, 2012.

Batlle, J. et al., "A review on strategies for recognizing natural objects in colour image of outdoor scenes," Image and Vision Computing, Jan. 1, 2000, pp. 515-530.

Bernhard Reitinger et al., "Augmented Reality Scouting for Interactive 3D Reconstruction," Virtual Reality Conference, 2007, Mar. 1, 2007.

Cathala, T., et al., "Real time simulation tools in the CHORALE workshop," Proceedings of the SPIE, Jan. 1, 2006.

Davison et al., "MonoSLAM: Real-time single camera SLAM." Pattern Analysis and Machine Intelligence, IEEE Transactions on 29.6, 2007: 1052-1067.

Dong, Zilong, et al., "Keyframe-based real-time camera tracking," Computer Vision, 2009 IEEE 12th International Conference on. IEEE, 2009.

Feiner et al., "A Touring Machine: Prototyping 3d Mobile Augmented Reality Systems for Exploring the Urban Environment," Proceedings of the 1st International Symposium on Wearable Computers, pp. 74-81, Oct. 13-14, 1997.

Hautiere et al., "Automatic Fog Detection and Estimation of Visibility Distance Through Use of an Onboard Camera," Machine Vision and Applications, vol. 17, No. 1, Apr. 2006, pp. 8-20.

Heinrich et al., "AR Weather," Mixed and Augmented Reality, Sep. 15-18, 2008, pp. 187-188.

Honkavirta, Ville, et al. "A comparative survey of WLAN location fingerprinting methods," Positioning, Navigation and Communication, 2009, WPCN 2009, 6th Workshop on. IEEE, 2009.

http://www.layar.com/browser/ retrieved from the internet on May 23, 2012.

Irschara, Arnold, et al., "From structure-from-motion point clouds to fast location recognition," Computer Vision and Pattern Recognition, 2009, CVPR 2009, IEEE Conference on. IEEE, 2009.

Li, Binghao, et al., "How feasible is the use of magnetic field alone for indoor positioning?," International Conference on Indoor Positioning and Indoor Navigation. vol. 13. 2012.

Li, Mingyang, et al., "High-fidelity sensor modeling and self-calibration in vision-aided inertial navigation," Robotics and Automation (ICRA), 2014 IEEE International Conference on. IEEE, 2014.

Liu, Hui, et al., "Survey of wireless indoor positioning techniques and systems," Systems, Man, and Cybernetics, Part C: Applications and Reviews, IEEE Transactions on 37.6 (2007): 1067-1080.

Lowe, "Distinctive Image Features from Scale-Invariant Keypoints," International Journal of Computer Vision 60 (2), 91-110, 2004.

Mark R. Stevens et al., "Precise Matching of 3-D Target Models to Multisensor Data," IEEE Transactions Image Processing, vol. 6, No. 1, Jan. 1, 1997.

(56) References Cited

OTHER PUBLICATIONS

Mikolajczyk et al., "A Performance Evaluation of Local Descriptors," IEEE Transactions on Pattern Analysis and Machine Intelligence, vol. 27, No. 10, Oct. 1, 2005, pp. 1615-1630.

Mitsutaka Susuki, et al., "Extrinsic Camera Parameter Estimation from a Still Image Based on Feature Landmark Database," Article of the Virtual Reality Society of Japan (NPO), Jun. 30, 2008, No. 2, vol. 13, pp. 161-170.

Mourikis and Roumeliotis, "A Multi-State Constraint Kalman Filter for Vision-aided Inertial Navigation," Robotics and Automation, 2007 IEEE International Conference, (Apr. 10-14, 2007), 8 pages.

Narasimhan, S.G., et al., "All the images of an outdoor scene," Lecture Notes in Computer Science, Jan. 1, 2002.

Robert, Kostia, Video-based traffic monitoring at day and night: Vehicle Features Detection Tracking, 2009 12th International IEEE Conference on Intelligent Transoprtation Systems.

Satoh et al. "A Hybrid Registration Method for Outdoor Wearable Mixed Reality," vol. 7, No. 2, pp. 129-138, 2002.

Satoh K. et al., "A hybrid registration method of Outdoor augmented reality," Proceeding. IEEE and ACM International Symposium on Augmented Reality, 2001, New York, NY, USA Oct. 29-30, 2001, Los Alamitos, CA, USA, IEEE Conput. Soc, US, pp. 67-76, SP010568049.

Sekai Camera, http://www.tonchidot.com/product-info.html retrieved from the internet on May 23, 2012.

Tsz-Wai Rachel Lo et al., "Local feature extraction and matching on range images: 2.5D SIFT," Computer Vision and Image Understanding, vol. 113, No. 12, Aug. 18, 2009.

Wixson, L. et al., "Improved illumination assessment for vision-based traffic monitoring," Visual Surveillance, Jan. 1, 1997, pp. 34-41.

www.insoft.com [retrieved from the internet on Aug. 23, 2016].

Zhiying Zhou et al., "Robust Pose Estimation for Outdoor Mixed Reality with Sensor Fusion," Jul. 19, 2009, Universal Access in Human-Computer Interaction, Applications and Services, pp. 281-289.

\* cited by examiner

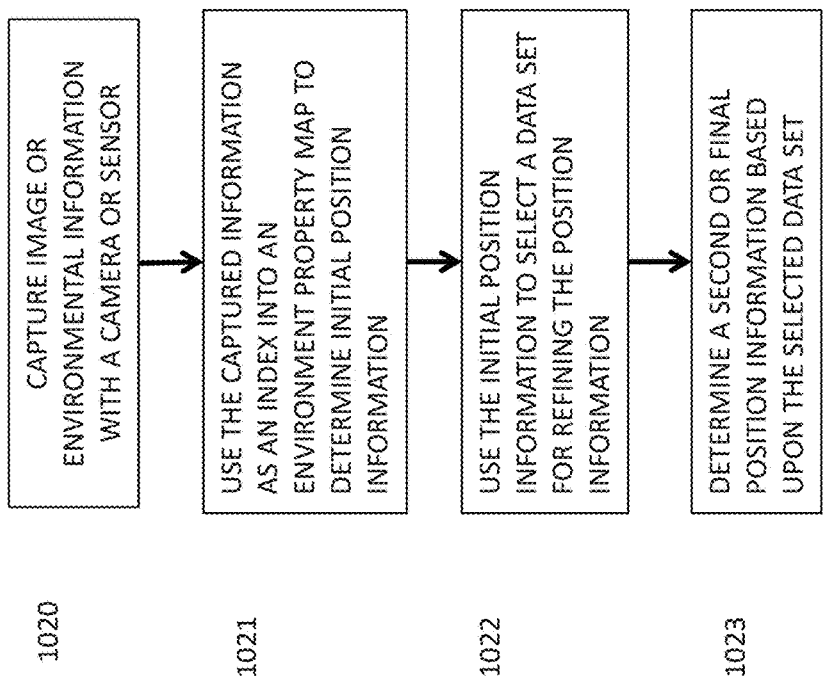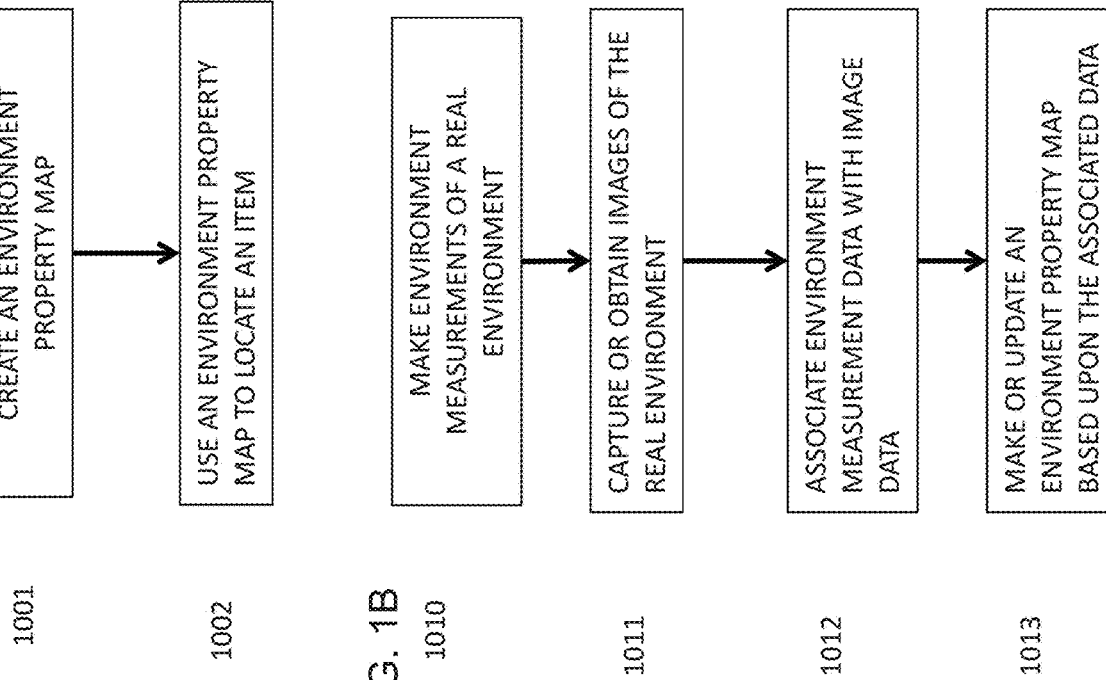

SYSTEM FOR DETERMINING POSITION BOTH INDOOR AND OUTDOOR

BACKGROUND

Localization and tracking of an item in a real environment is an interesting part of many useful endeavors. Depending upon the endeavor, the tracked item may be virtually anything, but routinely involves a person, a camera, an electronic device or a product. Some of the useful endeavors relate to navigation, item tracking, object recognition, 3D reconstruction, virtual reality and augmented reality. These endeavors may be embodied in hardware or software or both.

In one particular example, computer vision and/or optical analysis mechanisms may be used to determine a pose (e.g. position and orientation) of the camera relative to the real environment or a camera ego-motion (e.g. the 3D motion of a camera within an environment). In more particularity, computer vision techniques often involve analysis of images of the real environment being used to deduce pose or other position or localization information. The images may be obtained from any source, such as directly from one or more cameras/sensors or by acquiring image sets that were captured earlier. In either case, the images may be stored for analysis and the images and metadata associated with the images may be retained in a database.

Various computer vision methods may be used to estimate or determine tracking or localization information, such as information embodied in a camera pose estimation. For example, computer vision concepts, such as simultaneously localization and mapping (SLAM) and key-frame tracking, may be employed. In some SLAM implementations, frame to frame tracking matches image features of a current image with image features of previously captured images for simultaneous localization and 3D reconstruction. As another example, global tracking, such as key-frame tracking, matches image features of a current image with a reference image feature for online tracking. The reference image features may be obtained from a pre-constructed 3D model of the real environment (i.e. a cloud of 3D points of reference features) that is built offline.

One way to improve on computer vision-based localization and tracking techniques is to add environmental information to the analysis. For example, environmental factors, such as gravity or other known environmental situations, may be employed. As another example, where cameras have inertial measurement units (IMUs), environmental information may be obtained therefrom and associated with the images to improve localization and tracking. In addition, wireless signals, such as radio and ultrasound, may also be used to aid localization and tracking. For example, location fingerprinting helps locate a device by using Wi-Fi, Bluetooth, or a combination of device sensors.

SUMMARY

Various embodiments of the disclosure propose to combine all or select computer vision and environmental tracking and localization techniques to achieve improved overall results. For example, some embodiments involve the construction or use of an environment map, which includes environment property values ("EPVs") and positions reflecting image information as well as sensor-retrievable information. Other embodiments include hardware or software used for either or both of the construction or use of the environment maps.

By including both sensor-retrievable and image information in the localization and tracking process, the various embodiments disclosed herein may achieve superior results in locating an item in a real environment. For example, a camera pose estimation (in a real environment) may be better or more easily calculated or otherwise found by using a map having environment property values and positions that reflect a plurality of camera images of the real environment as well as environment property measurements measured and/or generated at known positions (i.e. relative to positions where images are captured).

In another set of embodiments, a device may be located by using device sensors to measure one or more environment properties at the device location; then, the measured amounts may be matched with an environment map to make a localization or tracking determination, such as the initial pose of the device. In other embodiments, the initial pose (or other localization or tracking determination), may be used to enhance the speed or accuracy of a subsequent machine vision-based camera pose estimation. For example, in one or more embodiments, the sensor-derived pose information may be used to significantly limit the database of image information that requires analysis during the machine vision portion of the process.

BRIEF DESCRIPTION OF THE DRAWINGS

FIGS. 1A through 1D show processes associated with embodiments of the disclosure.

DETAILED DESCRIPTION

Environment Properties and Signals

Figure 1D:
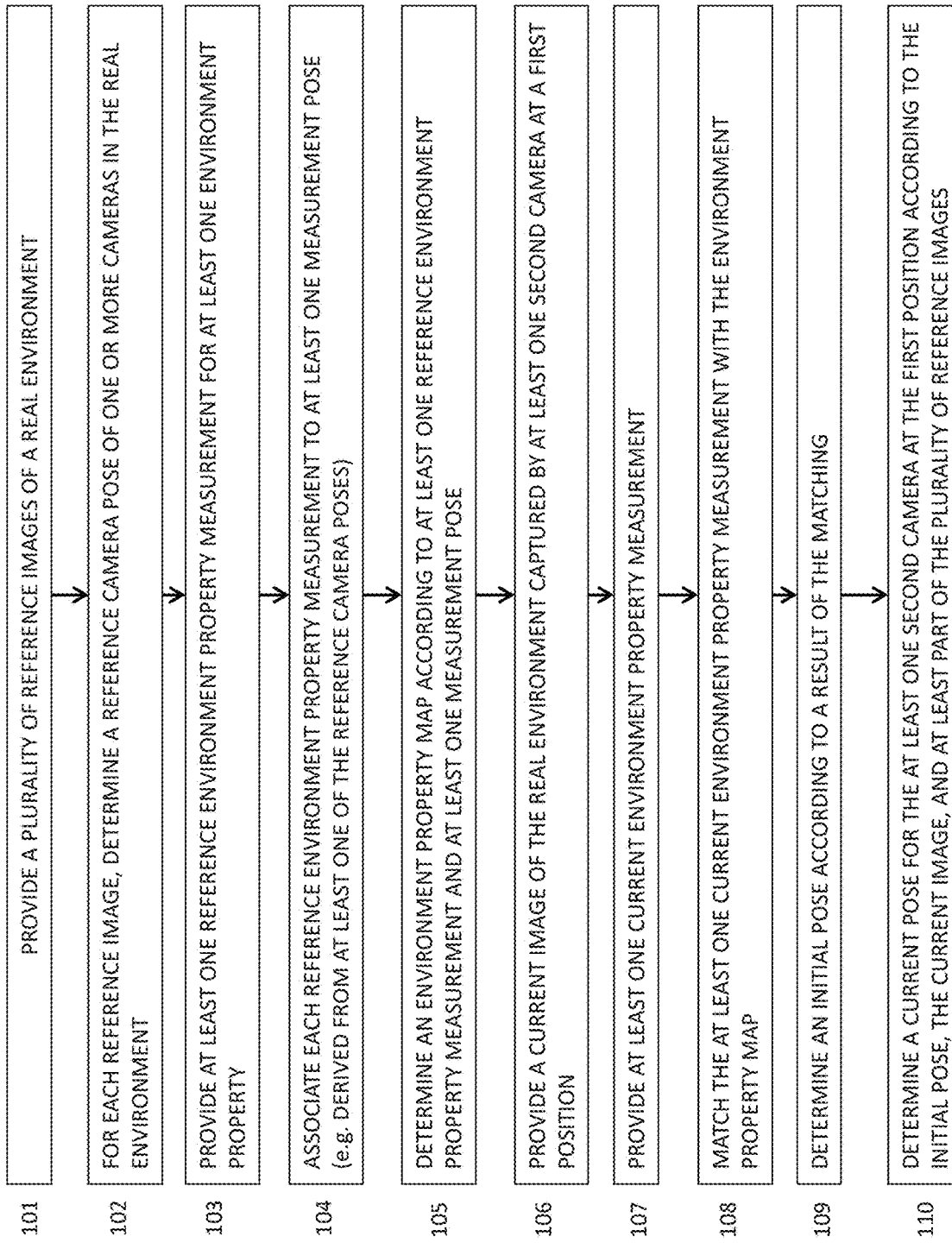

Some embodiments of the invention discuss the use of an environment property or environment properties. An environment property represents a characteristic of an environment, so an environment property of a real environment represents a characteristic of the real environment. The characteristic may be naturally occurring, such as by the Earth's magnetic field, the local atmospheric conditions (e.g. weather, sun or moon state, etc.), or the time or date. The characteristic may also be human-derived, such as a characteristic caused or altered by a real object or a living thing in the real environment. Thus, an environment property may also represent information or a signal sent or received by the real environment or by a real object located in the real environment.

In some embodiments of this disclosure, an environment property may include an environment signal property encoded by an environment signal (a "signal" in short). The environment signal may be sent from one or more signal transmitters located in the real environment. In addition, the environment signal may also be sent from at least part of the real environment, in which case, that part of the real environment may also be called or considered a signal transmitter. In some embodiments, the environment signal may be a wireless signal including audio information, WiFi, Bluetooth, light, or any radio, audio, light spectrum or electromagnetic signal of any kind. Moreover, many embodiments contemplate that the environment signal may be artificially generated and/or modified by human-made objects.

In some embodiments, an environment signal may be received by one or more signal receivers located within the real environment. Depending upon the embodiment, a signal receiver may be an electronic or electro-mechanical device that receives and/or reacts to signals.

In some embodiments, received signals may be measured to obtain signal property measurements. In one example, an environment signal comprises at least one of radio signals, environment light (e.g. visible light or infrared light generated by the sun or a lamp), sound (e.g. ultrasound, infrasound, or acoustics), and magnetic fields. Some example radio signals include at least one of WLAN, Bluetooth, Zigbee, Ultrawideband (UWB) or Radio-frequency identification (RFID). In addition, exemplary magnetic fields include artificial magnetic fields (e.g. that are generated by one or more coils deployed in the real environment) or a geomagnetic field (e.g. the Earth's magnetic field). Inside the real environment, significant variations of the geomagnetic field may be experienced. The cause of these variations could be local phenomena, such as the steel shells of modern buildings, pipes, wires, electric equipment or anything else in the real environment that blocks, absorbs, reflects or refracts a signal. Techniques for measuring these fields are known in the art.

An environment signal may carry information that is useful to embodiments of this disclosure. For example, an environment signal may encode one or more environment signal properties (a "signal property" in short), including Cell of Origin (CoO), Signal Strength (SS), Angle of Arrival (AOA), Time of Arrival (TOA), Time Difference of Arrival (TDOA), or any other indications known now or at the time these teachings are employed in future embodiments.

In some embodiments, an environment property may include information about a received signal, for example: the signal strength of a Bluetooth signal; the signal strength of a WLAN signal; the time of arrival of a Bluetooth signal; the time of arrival of a WLAN signal; the signal strength of an ultrasound signal; the time of arrival of an ultrasound signal; or, the signal strength of an environment light. While these examples are illustrative, the embodiments of this disclosure contemplate the use any useful environment property from various environment signals and environment signal properties.

In some embodiments of this disclosure, when an environment signal sent from a signal transmitter is received by a signal receiver, the value of an environment signal property may be measured. For example, the measurement may take place at the receiver and may be associated with the position of the receiver. This association may be recorded to be employed for matching against an environment map or for producing or updating an environment map. Many embodiments herein are agnostic to the form of storage, although some embodiments employ specialized data arrangements and may be maintained in relational databases or other physical memory managed by software.

Many embodiments of the disclosure contemplate that environment signal properties may be position dependent. For example, a signal property of a signal that is sent by a signal transmitter is received by a signal receiver at a position A relative to the signal transmitter, and may be measured as a value X. The signal may also be received by another signal receiver at a position B relative to the signal transmitter, and the signal property may be measured as a value Y. In this one example, the value X and the value Y may be different, as the position A and position B may be different. As a similar example, a signal property value may depend on a distance between the signal transmitter and the signal receiver and/or on signal propagation properties. The embodiments discussed herein may use semiconductors, sensors or other equipment to measure signal values and to access accuracy and propagation properties. Current versions of such systems are known in the art and the embodiments herein contemplate the use of improved and different equipment for this purpose in the future.

As suggested above, many embodiments of the disclosure contemplate that an environment property may include a natural environment property, such as temperature, humidity, brightness, time, date, gravity, altitude above sea level, weather data and the Earth's magnetic field. Varying embodiments further contemplate that local conditions may affect natural environment properties in both predictable and unpredictable manners. For example, brightness may be influenced by artificial light (e.g. from lamps) or natural light (e.g. from the sun), the presence and applicability of which may be known to the system.

In greater particularity, a natural environment property may be influenced by artificial objects. For example, temperature could be influenced by heaters, humidity could be influenced by humidifiers, and brightness may be influenced by electrical lighting and window treatments. Furthermore, an environment property may be position dependent. For example, a position close to a heater may have a higher temperature than a position further from the heater. In addition, a position in a room with air conditioning may have a lower temperature than a position in another room without air conditioning. Finally, an environment property may be also time dependent and position dependent. For example, in the morning, it is possible to measure a higher light strength in a room at a position close to a window facing East than at a position close to a window facing West. In the afternoon, it is also possible to measure a lower light strength in a room at a position close to a window facing East than at a position close to a window facing West.

Environment Property Map

As mentioned above, some embodiments of the disclosure employ, construct or update an environment property map. In some embodiments, an environment property map includes at least one pair of datums, including an environment property value and a position for an environment property. For example, this pairing might be expressed as "(EPV, Position)." In one or more embodiments, the position indicates a region or a position in the real environment where the environment property value applies. In some embodiments, an environment property map may include multiple different types of environment properties. Thus, the pair of the value and the position contained in the environment property map may further optionally have an associate time parameter. For example, this grouping might be expressed as "(Position, EPV, Time)." Of course, the grouping of properties may be extended to include any number environment property values and other factors. The following are examples: "(Position, EPV, EPV2-EPVn, Time)."

Moreover, the grouping of information, may include other datums that make the environment property values more useful. For example, other datums might include: information indicating the reliability of one or more EPVs, for example based upon history; information about the position, such as indoor/outdoor, an address, primary use of the room, etc.; or, information (such as accuracy, tolerance or specifications) about the sensors or other source of the position, time or EPVs.

Overview Process Embodiments

With reference to FIG. 1A, there is shown a process associated with many embodiments of the disclosure. At process portion 1001 an environment property map is created. As discussed below, there are many ways to create an environment property map, including, for example, by using a combined camera and sensor device to collect reference images and reference environment property values in a real environment. In some embodiments, environment property maps may be constructed by the intentional deployment of cameras/sensors in a real world environment to collect data. In other embodiments, the data may be collected in a crowd source fashion, where device end-users (e.g. smartphone, tablet, vehicles) move through their routine life, while their device collects data for environment property maps. The device may use a background application to collect the data in a way that does not interfere with the end-user's enjoyment of their device. In another embodiment, a crowd source or other end-users may employ a foreground application to collect data for environment property maps due to community incentive or an express incentive to do so.

Referring again to FIG. 1A, at process portion 1002 the environment property map is used to locate an item. As discussed below, the precision of the item location may be at any level but is, in many embodiments, the determination of a camera or sensor pose. Thus, in one embodiment, an end-user's device may use the environment property map to facilitate navigation (e.g. finding items or directions inside a building), augmented reality (e.g. learning about items in the real environment by augmentation of real environmental information), virtual reality (e.g. activity in an artificial world that is affected by activity in the real world). Furthermore, in some embodiments, the environment property map may be stored locally to the device using the map. Local storage may provide a performance advantage. In other embodiments, the environment property map may be stored at a server or other computer accessed over a network. Network-based storage provides the opportunity for more robust processing of the map data and for more rapid updating. In yet another embodiment, part of the environment property map may be stored local to the user device and part may be stored remotely. For example, if the overall map reflects data for a state, the device might carry only data for the city or area within the state where the device resides.

Referring now to FIG. 1B, there is shown another process diagram associated with various embodiments of the disclosure, including with particularity certain embodiments relating to creating an environment property map. At process portion 1010 environment properties are measured in a real environment. Sensors of any known type may be used to make the measurements and the measured valued may be processed or stored either on the device making the measurements (e.g. a smartphone) or at a server or other device that receives the measurement data from the measuring device, for example, wirelessly over the Internet. At process portion 1011, images of the real environment are captured or obtained. In some embodiments, the resulting image files include or are accompanied by any available image metadata, such as time and location data. At process portion 1012, the environment property measurements are associated with the image data (and metadata if present). For example, each image may be associated in a database with environment property measurements made in the same place, or at the same time as the image capture. The association of data may take place on the capturing device or on a connected server or other computer. At process portion 1013, the associated data is employed to construct or update (e.g. augment) an environment property map. The map may be constructed on a device local to the measurements and image capture (e.g. one of the capture devices) or on a connected server. In one embodiment, and regarding the workload sharing between devices, there are multiple local devices for gathering data (images and environment measurements). In some instances multiple local devices will communicate with another specially equipped local device and the specially equipped local device will communicate with a server. The specially equipped local device may be one of the units collecting data or may be a different local computer, possibly a desktop or server computer. The specially equipped local device may have more processing power, memory or a better (e.g. wired) Internet/network connection, or, in alternative embodiments, may be identical to one or more units used for data collection. By using a system including a specially equipped local device, all of the local devices can be more specialized and workloads can be divided accordingly.

Referring now to FIG. 1C, there is shown another process diagram associated with various embodiments of the disclosure, including, with particularity, certain embodiments relating to using an environment property map. At process portion 1020 an image or environment information is captured or measured with a camera or sensor, which for purpose of this illustration is called a user camera/sensor. The user cameras/sensors employed with respect to FIG. 1C may be the same or different as the cameras/sensors employed with respect to FIG. 1B. At process portion 1021, the information captured or measured by the user camera/sensor is used as an index or entry point into an environment property map in order to determine an initial position of the user camera/sensor. For example, the captured/sensed information may include WiFi strength from a specific WiFi router. By indexing into the environment property map with this information, a relatively small location or area will likely be associated with the WiFi strength from the particular WiFi router. However, by using WiFi (or many other sensed signals as discussed below) instead of computer vision, the system is able to eliminate many locations or areas that appear identical or similar to the area in which the user camera/sensor is making readings. As discussed below, the captured or sensed information may vary according to embodiment and one or more types of sensed/captured information may be simultaneously employed. Furthermore, the position information may be any localization in the real environment. In some embodiments the position information is a camera/sensor pose or portion thereof.

Moving to process portion 1022, the initial position information obtained in process portion 1021 may be used to select a data set for refining the position information. For example, the system may wish to find a camera pose for the user camera/sensor using computer vision type techniques. By using the initial position information from process portion 1021, the size of computer vision information that must be searched or analyzed becomes greatly reduced (e.g. there are fewer images to analyze). Recalling the WiFi example above, if the real environment is a city block, there may be many millions of images for consideration in a computer vision technique. Furthermore, many of the images may be similar or even identical (images of different apartments that are built in clone fashion). By using the WiFi (or similar) information, a relatively large amount of the images may be eliminated from consideration.

Finally, at process portion 1023 a refined position is determined for the user camera/sensor. In many embodiments the refined position is determined by a machine vision technique such as SLAM and the position is expressed as a camera/sensor pose.

DETAILED EMBODIMENTS

With reference to FIG. 1D, there is shown a process diagram associated with many embodiments of the disclosure for determining a camera pose relative to a real environment. The process diagram and exemplary embodiments are explained based on examples and potential scenarios shown in FIGS. 2-7. With reference to FIG. 1D, at 101, a plurality of reference images of a real environment are provided. In one or more embodiments, the referenced images may be captured by a camera. In other embodiments, the reference images may be captured by a plurality of different cameras or obtained without knowledge of the camera or device associated with capture.

Figure 2:
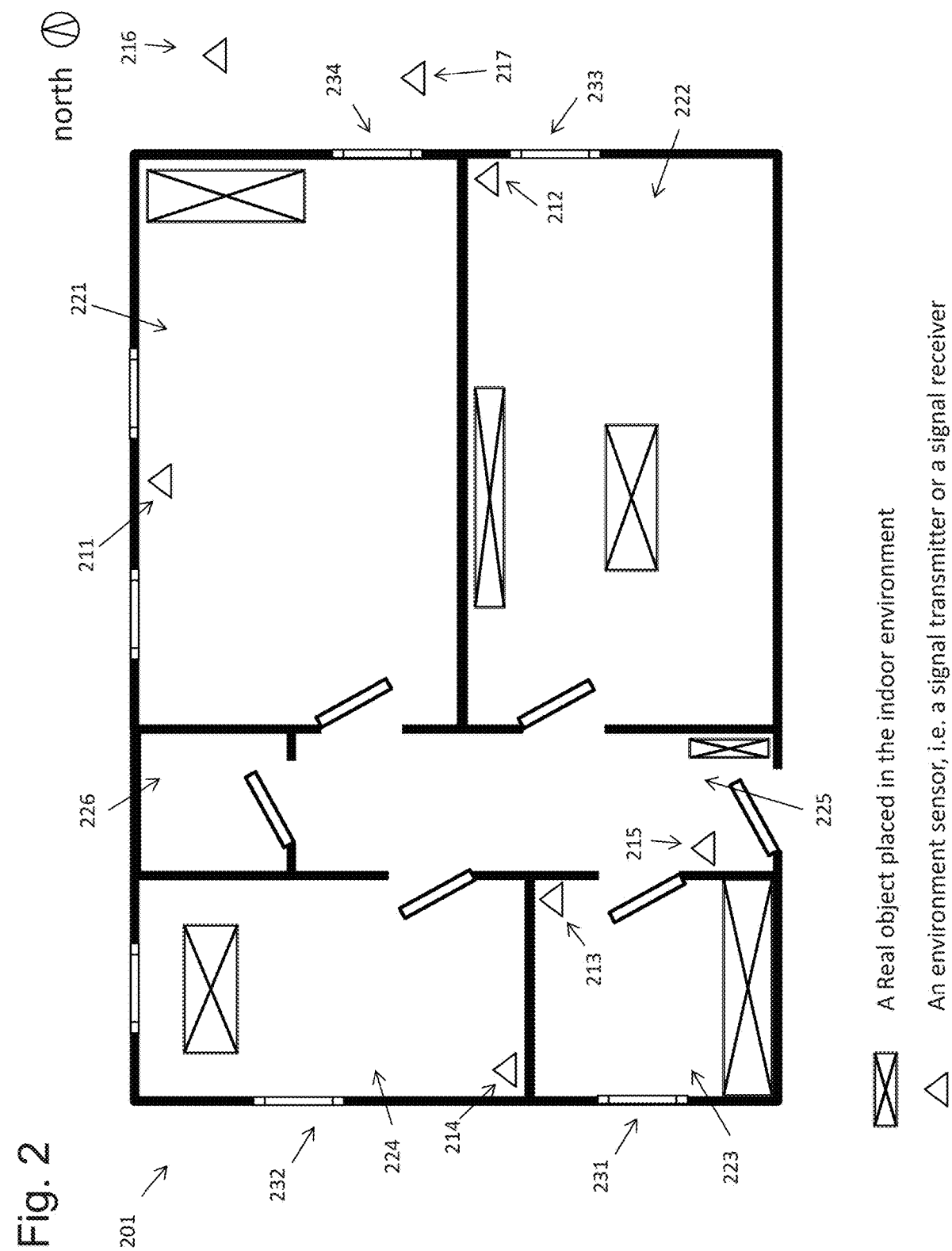
FIGS. 2-6 each show a sample layout of a real environment and illustrate various aspects of differing embodiments.

The real environment referred at 101 may be any real environment (as opposed to a computer-generated environment) and an example real environment is shown in FIG. 2. With reference to FIG. 2, the illustrated real environment is a top view showing an indoor portion 201 and an outdoor portion, which is shown outside of the boundaries of 201. The real environment 201 includes the following: rooms 221, 222, 223, 224, 225 and 226; signal-sensitive objects 211, 212, 213, 214 and 215, which all reside inside the indoor portion 201; signal-sensitive objects 216 and 217, which both reside outside of the indoor portion 201; windows 231 and 232, which face West; and, windows 233 and 234, which face East.

According to one or more embodiments, each of the signal-sensitive objects 211 through 217 may send or receive (including measure) an environment signal. Thus, for example, each of the signal-sensitive objects 211 through 217 might be a transmitter, a receiver, or a transceiver (such as a WLAN access point, cell base station or other radio-communication access point). Furthermore, a signal-sensitive object that receives a signal may also modify the received signal and send the modified signal (or otherwise develop a signal based upon the received signal and send out the developed signal). Varying embodiments of the disclosure contemplate different potential types of signals including, but not limited to, a radio signal, a sound signal, a light signal, or a magnetic signal.

In some embodiments and for purposes of illustration: the signal-sensitive object 211 may be a radio-frequency identification (RFID) device, which could either be a RFID tag or a RFID reader; the signal sensitive-object 212 may be a WLAN access point; the signal-sensitive object 213 may be a Bluetooth sensor (e.g. Bluetooth tag); the signal-sensitive object 214 may be an ultrasound sensor; the signal-sensitive object 215 may be an infrared radiation sensor; the signal-sensitive object 216 may be a satellite that is able to send or receive any radio signals; and the signal-sensitive object 217 may be a mobile cellular base station.

Figure 3:
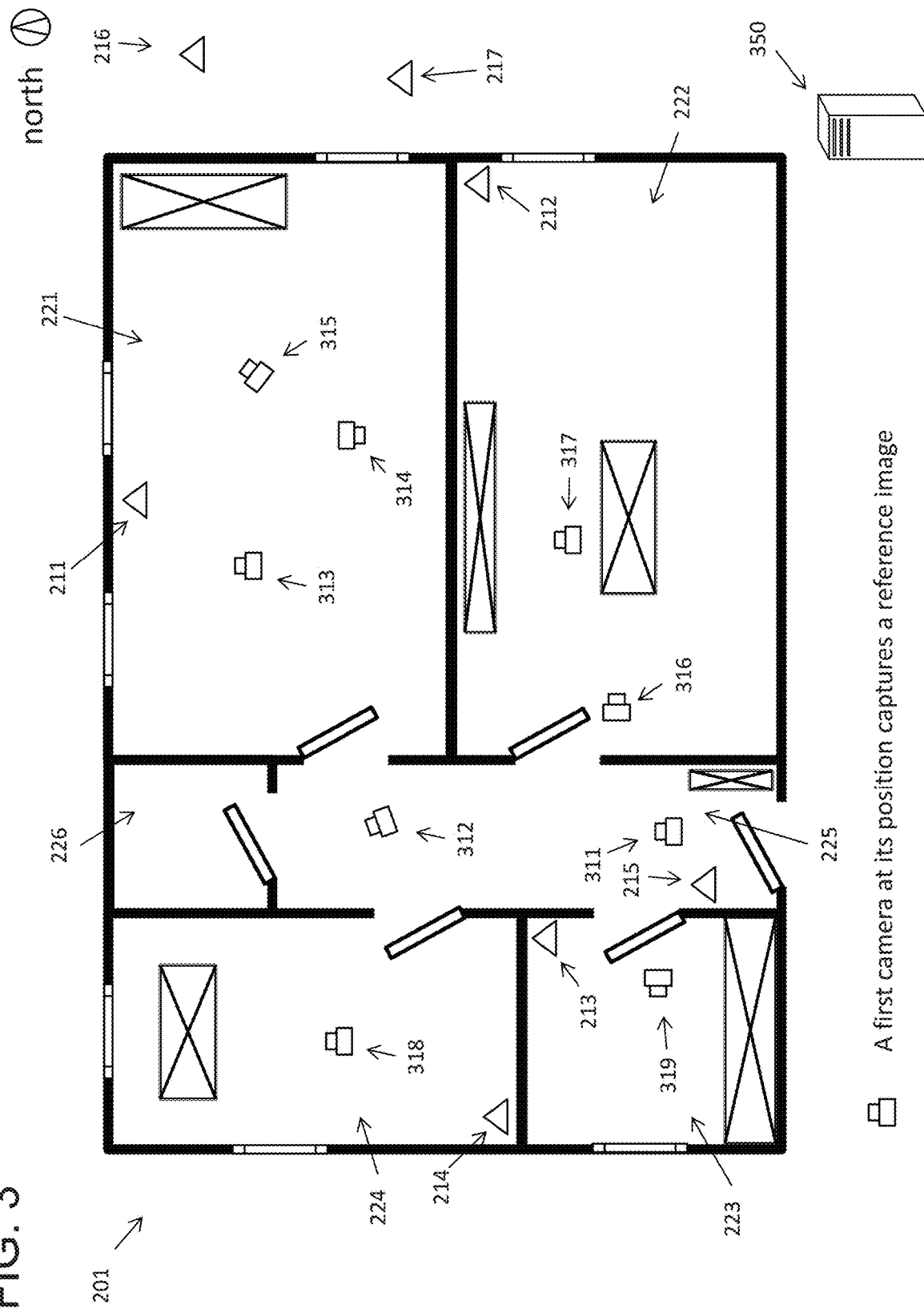

With reference to FIG. 3, there is shown the real environment from FIG. 2, having additional features. For example, FIG. 3 shows the sensors 311, 312, 313, 314, 315, 316, 317, 318, and 319. According to varying embodiments of the disclosure, sensors 311-319 may be any type of sensor that measures or captures information regarding the real environment. In some embodiments, sensors 311-319 may be cameras to capture reference images at corresponding positions in the real environment 201. In at least one embodiment, there may only be a single camera that is moved to the corresponding positions (and potentially other positions) to capture reference images. In yet other embodiments, there may be multiple cameras (e.g. 2 or more) that are moved or otherwise manipulated (e.g. through motion, mirrors or communications) to capture reference images at the indicated positions 311 through 319, and perhaps other positions. Finally, in yet other embodiments, there may be more than one camera per position 311 through 319, for example, to employ different capabilities of the different cameras or to access multiple features or sensing operations simultaneously.

Referring again to FIG. 1D, at 102 a determination is made of a reference camera (or other sensor) pose for each of the plurality of reference images (indicated in 101). For example, in one or more embodiments, the reference camera pose indicates a pose relative to the real environment at the position at which that respective reference image is captured (or other sensor data measured/taken). Furthermore, depending upon the embodiment, the determined pose may include a three-dimensional position and orientation or any part of such data. According to one embodiment, various computer vision methods could be employed to determine the reference camera poses of a camera or sensor based upon one or more images/data captured/measured by the camera/sensor. For example, vision-based Simultaneous Localization and Mapping (SLAM) is well-known in the art and can estimate or determine camera poses in a real environment and reconstruct a geometrical model of the real environment at the same time without prior knowledge of the real environment. The created (or "reconstructed") geometrical model may be represented by a plurality of image features, each corresponding to a reconstructed 3D position. The 3D positions may correspond with places in the image such as point features or edge features.

Having at least two images captured by one or more cameras, a typical SLAM includes one or more of the following: feature detection, feature description, matching, triangulation, and map refinement (e.g. global map refinement). Feature detection refers to a process of detecting image regions, each of which represents an image feature. Feature description is the transformation of the detected image region into a typically more dense representation (e.g. Scale-Invariant Feature Transform (SIFT) or Speeded Up Robust Feature (SURF) that is robust or invariant to certain types of variations (e.g. (non-uniform) lighting, rotation and occlusion). Matching refers to determining feature correspondences between image features extracted from different images. In many SLAM applications, the matched features may be considered to represent the same real object feature in the real environment. Triangulation refers to determining a 3D position for one real feature based on at least two matched image features. A typical SLAM application is based on a frame-to-frame process and may be employed to determine camera poses online (i.e. as compared to offline).

In one embodiment, SLAM may be used to determine the camera poses to be used as a reference (i.e. reference camera poses). Each reference camera pose is typically based upon an analysis of multiple reference images. Further, in some embodiments, reference image features (e.g. in addition to pose) are extracted from the reference images and 3D positions are determined for each of the reference image features.

In some embodiments, another vision-based technique called "structure from motion" ("SFM") may be employed for camera or sensor pose estimation or 3D geometrical reconstruction from reference images (e.g. sequences of images). Unlike SLAM, a typical SFM is based on a global scheme. Thus, for example, in performing pose estimation or 3D reconstruction, all images may be analyzed within the same computation framework instead of frame to frame. The typical SFM may use a process including: feature detection, description, matching, triangulation and map refinement (e.g. global map refinement). In one embodiment, SFM may be used to determine the reference camera or sensor poses based on the reference images. Furthermore, SFM may also be employed to extract reference image features in the reference images and determine 3D positions of the reference image features.

In yet another set of embodiments, a known 3D model of the real environment may be provided for determining the reference camera or sensor poses. The known 3D model may include features and associated 3D positions to serve as references. For example, by comparing image features extracted in one respective reference image with features contained in the known 3D model, it is possible to build image feature correspondences. A reference camera pose for the respective reference image could be estimated from one or more image feature correspondences.

In a further set of embodiments, one or more real visual markers may be placed in the real environment. The markers may facilitate determining the reference camera or sensor poses because each marker may be captured in multiple reference images. The presence of the markers provide for easy feature alignment (at least with respect to the markers themselves) and facilitate the determination of pose information.

In other embodiments, depth information may be used to estimate camera or sensor pose information. For example, some embodiments may employ one or more depth maps or reference images with depth information. In at least one instance, the one or more sensors may be a RGB-D camera that is able to capture an image including depth information. It is also possible to use only depth information of the reference images (e.g. depth maps) for determining reference camera poses. This result may be achieved by matching or aligning depth data of the reference images based on any iterative closest points (ICP) algorithm, which is known in the art.

In yet a further set of embodiments, one or more sensors may incorporate inertial measurement units (IMUs). IMUs are known in the art and often provide measurements and report an item's specific force, angular rate and potentially the magnetic field surrounding the body. IMUs may be composed from a combination of sensors, such as accelerometers, gyroscopes or magnetometers. In practicality, IMUs provide velocity, orientation or gravitational forces of an item associated with the sensor. In one example, one or more IMUs could be attached to a camera or other sensor and provide inertial measurements as discussed. The inertial measurement may be combined (e.g. associated with) image features extracted in the reference images, and camera or sensor pose may be estimated thereby.

Reconstructing a 3D Environment Model of at Least Part of a Real Environment

According to one embodiment, a 3D environment model includes two or more reference image features extracted from reference images. The 3D environment model includes 3D positions for each of the reference image features. In one example, the reference image features and their 3D positions may be determined from reference images based on a computer vision method (e.g. the SLAM approach or the SFM approach). In another example, when depth information is available for the reference images, the 3D positions for the plurality of reference image features may be determined from the depth information.

In some embodiments for assembling a 3D environment model, a reference image feature may be related to one or more reference images, if the one or more reference images contain either the reference image feature or any image feature matched to the reference image feature.

Reference Environment Properties

Referring again to FIG. 1D, at 103 at least one reference environment property measurement is made or provided for at least one environment property. For example, the real environment may include one or more different environment properties. Each environment property may be measured to obtain one or more environment property measurements. In one example, one environment property could be measured by one or more sensors multiple times at different positions or at different points in time.

In one sample embodiment, one environment property represents a property of an environment signal that is sent by a signal sensor. For example, the environment property may be data related to timing or signal strength of any signal. Some specific possibilities are as follows: the signal strength of a Bluetooth signal; the signal strength of a WLAN signal; the time of arrival of a Bluetooth signal; the time of travel of a Bluetooth signal; and, or the time of arrival of an ultrasound signal.

Figure 4:
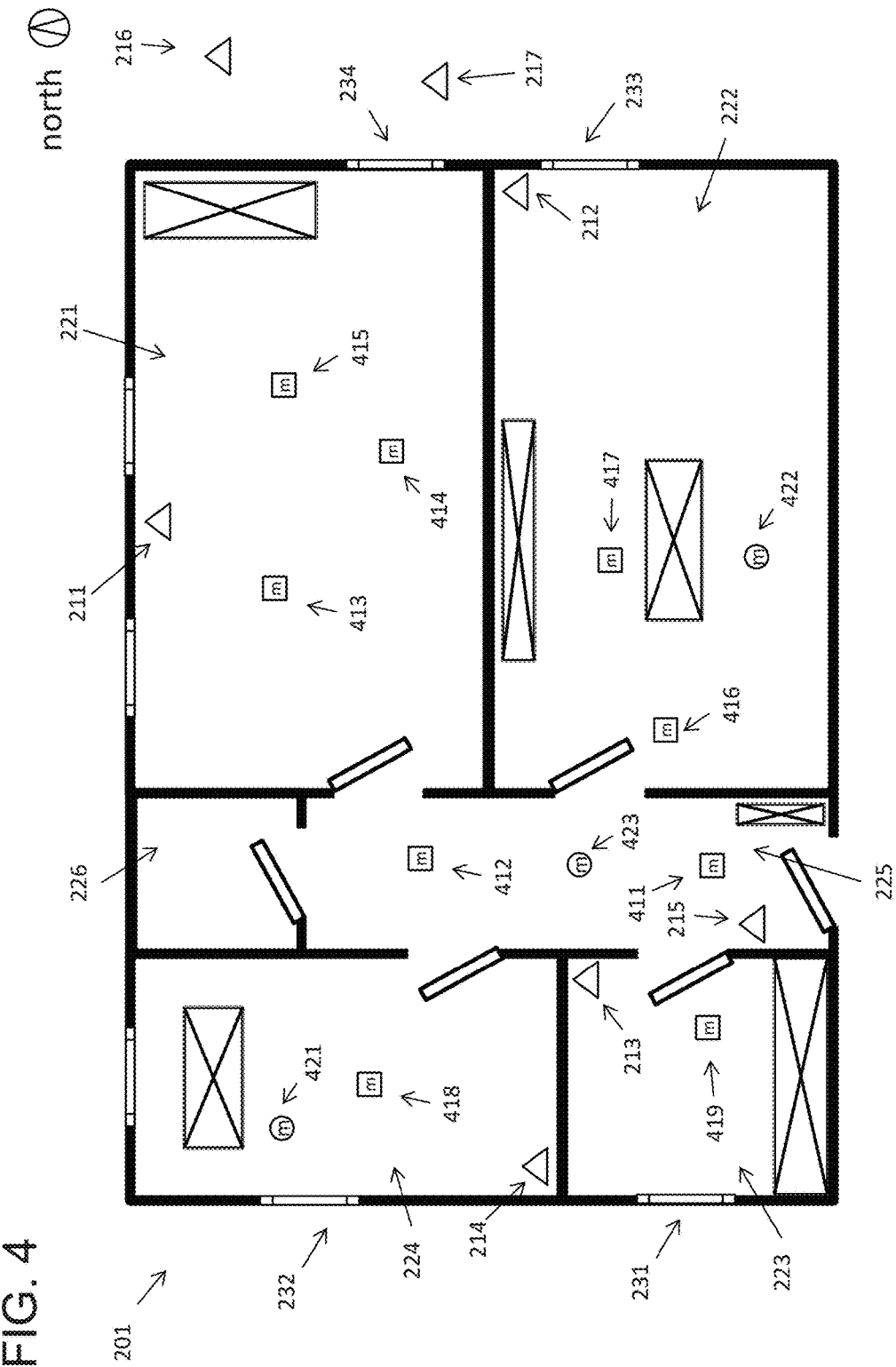
Figure 5:
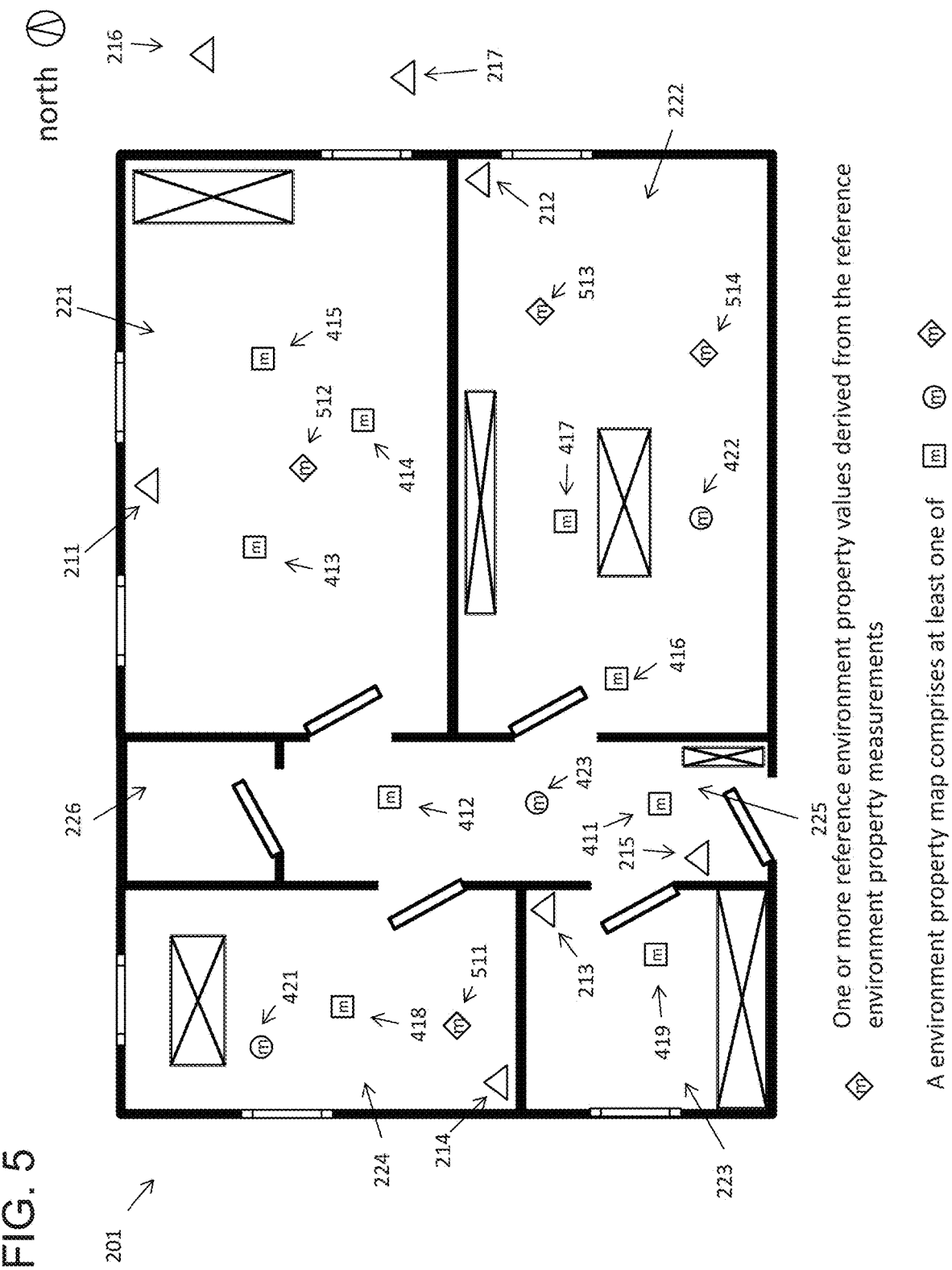

Referring now to FIG. 4, there is shown an illustration depicting environment property measurements indicated by 411, 412, 413, 414, 415, 416, 417, 418, 419, 421, 422, and 423. Thus each of 411-419 and 421-423 represent a position of an environment property measurement, and each such measurement may include one or more environment property.

In some embodiments, environment signals sent from one or more signal-sensitive objects 211 though 217 may be measured by sensors as properties of the environment. Thus, environment properties may be measured by one or more sensors associated with (e.g. attached to) cameras/sensors 311 through 319 at positions where the cameras/sensors capture reference information such as reference images. These measurements may be reference environment property measurements as indicated by 411 through 419, shown in FIG. 4. In one embodiment, the environment property measurement 411 may include one measurement of one signal sent from one of the signal-sensitive objects 211 through 217. In other embodiments, the environment property measurement 411 may include or be derived from multiple measurements of multiple signals sent from multiple signal-sensitive objects of the signal-sensitive objects 211 though 217. Similarly, each of the other environment property measurements 412 though 419 may include or be derived from one or more measurements. Thus, in one or more embodiments, the reference environment property measurements 411 through 419 may be associated with reference camera/sensor poses for the cameras 311 through 319 respectively (e.g. in an environment model).

The environment properties may also be measured by the sensor(s) attached to cameras at positions indicated by 421 though 423, even when no reference image is captured at that location (e.g. by a camera). However, the positions indicated by 421 through 423 may be determined from vision-based tracking (e.g. derived from at least one of the reference images and an image captured by a camera at the positions 421 through 423).

In another set of embodiments, environment signals may be sent from one or more sensors attached to one or more cameras. Properties of the environment signals (i.e. environment properties) may be measured in turn by one or more of the signal-sensitive objects 211 though 217. In one example, the environment signals are sent from the sensor(s) attached to one or more cameras at positions where at least part of the reference images are captured. Then, the environment signals are measured as reference environment property measurements by one or more of the signal-sensitive objects 211 through 217. For example, the reference environment property measurement indicated by 411 may represent a measurement for an environment signal sent from the sensor attached to the camera 311 and measured by one of the signal-sensitive objects 211 through 217. The reference environment property measurement indicated by 411 may, in other embodiments, represent multiple measurements for the signal sent from the sensor attached to the camera 311 and measured by multiple signal-sensitive objects of the signal-sensitive objects 211 through 217. In this case, the reference camera pose of the camera 311 may be assigned to a measurement pose related to the reference environment property measurement 411.

Varying embodiments of this disclosure contemplate any and all possible or practical combinations of the examples, techniques and sub-techniques mentioned above for reconstructing a model. Some practical possibilities with respect to varying embodiments are as follows:

The environment properties, for which at least one reference environment property measurement is provided, may be encoded by environment signals sent from at least part of the signal-sensitive objects 211 through 217 and sent from the sensor(s) attached to the at least one reference camera.

The signal strength of the environment signals, such as received signal strength, may be measured as a reference environment property measurement. The environment signals may have the same signal type or different signal types.

Temperature and/or humidity of the real environment may be measured by sensor(s) attached to a camera. The temperature and/or humidity could be measured as multiple measurements at different positions or times in the real environment.

Gravity or altitude of a camera or sensor may also be measured as a reference environment property measurement. For example, at the positions (indicated by 311 through 319 as shown in FIG. 3) where the at least one camera captures reference images, the gravity or altitude of the camera may also be measured.

Light strength may be measured by a sensor, such as a sensor attached to a camera.

The (e.g. current) time may be recorded and related to one or more reference environment properties (including the measurement of each reference environment property). For example, the current time could be recorded coarsely as "morning" or more specifically as "10:03 AM, Central Time, May 25, 2016," or at any other level of specificity. In practical application, a measurement of the light strength at the position indicated by 419 in the room 223 may be lower than a measurement of the light strength at the position indicated by 417 in the room 222 at the current time. In this example, the reference environment measurements 417 and 419 may each include a light strength measurement.

Associating a Pose with an Environment Property

With reference again to FIG. 1D, at 104 the process associates one or more reference environment property measurements to at least one measurement sensor/camera pose. The association may be recorded in a memory or database, including in a special data structure for accessing information quickly or efficiently. In many embodiments, the measurement pose is obtained at process portion 102 as a part of the reference camera pose. Furthermore, as discussed above, in many embodiments, the camera pose may be derived from at least one of the reference camera poses. Furthermore, measurement sensor/camera pose may include position and orientation information, or only position (translation) information, or any other subset of a full set of pose information.

In one example, at least one environment property is measured at one or more positions (indicated by 311 through 319 as shown in FIG. 3) where a camera captures one or more reference images. The reference camera poses or a part of the reference camera poses for the cameras 311 through 319 may be directly assigned as measurement poses to the reference environment property measurements 411 through 419. In one example, only the translational part of a reference camera pose is related to a respective reference environment property measurement. In another example, it is also possible to relate both the translational part and the rotational part of the reference camera pose to the respective reference environment property measurement.

In one or more embodiments, an environment signal that encodes at least one environment property may be sent from a camera and measured by sensors at other places. For instance, environment signals may be sent from the cameras/sensors 311 through 319 (e.g. from a sensor attached to each camera) where the cameras capture the reference images; then, the environment signals may be measured as the reference environment property measurements 411 through 419 by one or more of the signal-sensitive objects 211 through 217. In some embodiments, the reference camera poses or a part of the reference camera poses for the cameras 311 through 319 may be directly assigned as measurement poses to the reference environment property measurements 411 through 419.

According to another embodiment, it is also possible to send the environment signals or measure the environment signals by a camera/sensor at a position where the camera/sensor does not capture any reference image. For example, the environment property measurements 421 through 423 may not correspond to any camera positions indicated by 311 through 319, where reference images may actually be captured. However, measurement poses to be related to the environment property measurements indicated by 421 though 423 may be derived from vision-based tracking and at least one of the reference camera poses of the cameras 311 through 319.

Determining an Environment Property Map

With reference again to FIG. 1D, at process position 105, an environment property map (or portion thereof) is determined according to the at least one reference environment property measurement and at least one measurement pose. The environment property map may include at least one pair of an environment property value and a position for an environment property. In some embodiments, the value could be one reference environment property measurement and the corresponding position could be one measurement pose (or aspect thereof) associated with the reference environment property measurement. For example, the environment property map may include at least part of the environment property measurements 411 through 419 and 421 through 423 and their associated measurement poses (or portions thereof).

Further, in some embodiments, an environment property map includes associated time/date data. For example, a time parameter may be associated with one or more environment property measurements 411 through 419 and 421 though 423. The time parameter may indicate an exact time up to a certain desired precision, such as morning, 10 AM, 10:32:27:6788 AM or any combination including any information indicating time or date. For example, the time parameter may indicate a specific time or time period, such as time between 10:00 and 15:00, morning, winter, or Monday.

In some embodiments, an environment property value may be obtained for any arbitrary target position in the real environment, and the environment property value and the target position may be added to a data collection to build an environment property map. An environment property value at the target position may be derived from the at least one reference environment property measurement discussed with respect to process portion 103 above.

With respect to environment properties that are encoded by an environment signal, determination of an environment property value from a reference environment property measurement may be performed according to: a signal propagation property; or, distances between the target position of the environment property value and the position (i.e. the measurement pose) of the reference environment property measurement.

In some embodiments, environment property values may be obtained by interpolation. For example, with reference to FIG. 5, there is shown an illustration of the real environment. As part of the example, we assume that there are no reference environment property measurements at positions indicated by 511, 512, 513, or 514. However, some embodiments of the disclosure contemplate calculating environment property values 511 through 514 for the positions indicated by 511 though 514 by interpolating or extrapolating at least part of the environment property measurements 411 through 419 and 421 through 423. Therefore, in one or more embodiments, a target position in the real environment may be first provided; then, an environment property value may be determined from the provided target position and existing environment property measurements and their associated positions. The determined environment property value may be associated to the provided target position, and the pairing may be used to build or augment an environment property map. Of course, in many embodiments, an environment property map may include at least part of the environment property measurements 411 through 419 and 421 through 423 as well as at least part of environment property values 511 through 514. For clarity, both terms "environment property measurement" and "environment property value" represent a value of an environment property. The environment property measurement indicates that the value is determined from a sensor, while the environment property value indicates that the value is either determined from a sensor or from estimation (e.g. interpolation or extrapolation) based on other environment property values.

Using the Environment Map

With reference to FIG. 1D, process position 106 provides a current image of the real environment captured by a camera or sensor at a first position. The camera may be one of the same cameras discussed above in the construction of the environment map. Alternatively, the camera may be a different camera, for example a camera of an end-user of a system that employs the environment map for navigation, augmented reality or virtual reality. This type of camera may be referred to hereafter as a user camera, where the earlier-discussed cameras (311 through 319 involved in map creation) may be referred to as reference cameras. Importantly, in many embodiments a user camera and a reference camera may be the same camera device or different camera devices, thus the distinction draws from the instant function of the camera.

Figure 6:
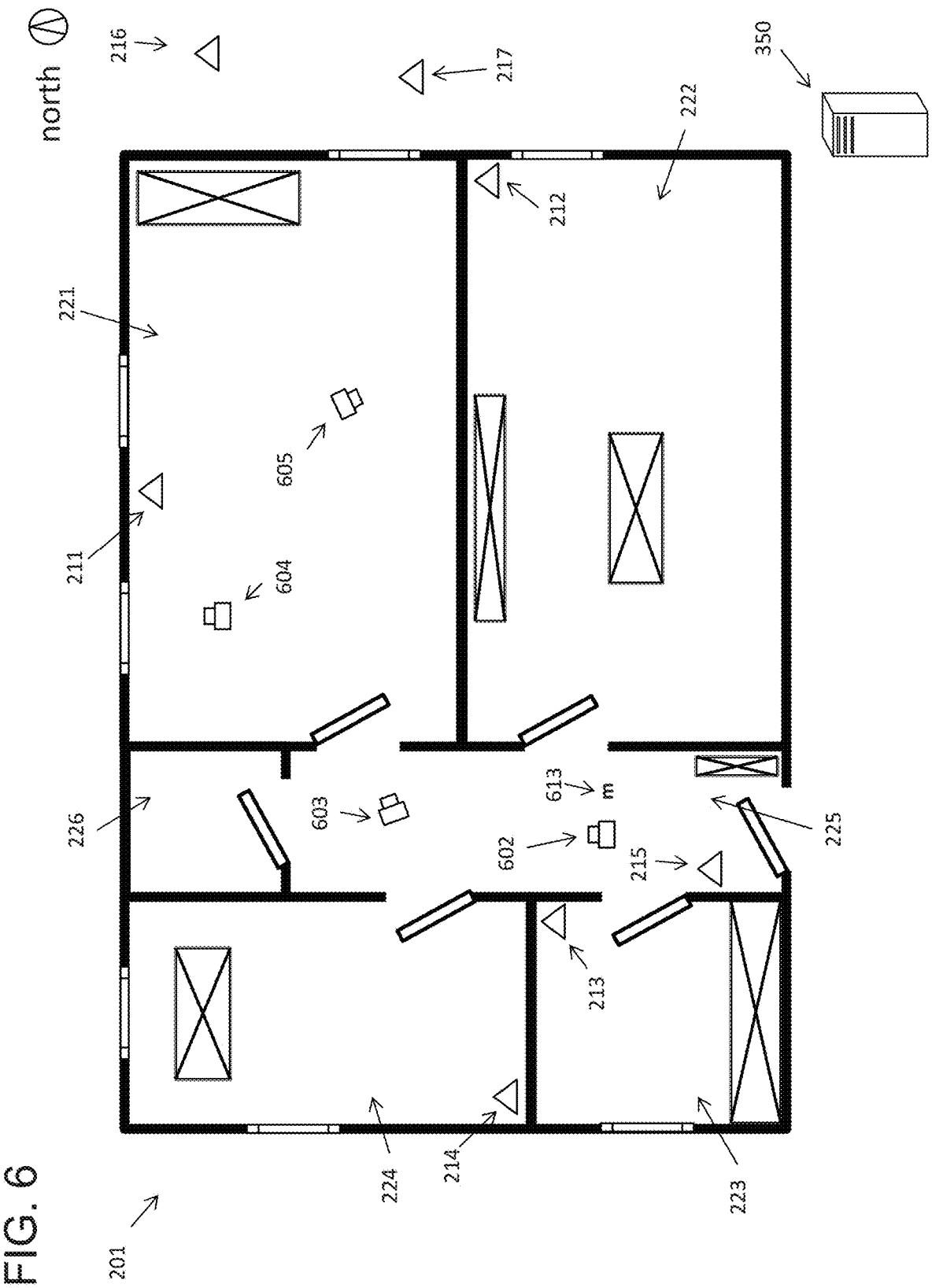

With reference FIG. 6, there is shown user camera 602, and a current image of the real environment 201 may be captured by camera 602 at the position indicated by 602. In one or more embodiments of the disclosure, a current camera pose of user camera 602 is determined relative to the real environment 201. According to one embodiment, the current pose may be determined as follows: current image features may be extracted in the current image and matched to the reference image features extracted in the plurality of reference images; the current image features have 2D image positions in the current image, and the reference image features have 3D positions; the 2D-3D feature correspondences may be built from the feature matching process; and, the 2D-3D feature correspondences may then be used to estimate the current camera pose.

However, matching the current image features with a huge amount of the reference image features (in particular for a large environment) would be computationally expensive and error-prone. For example, there may exist many similar reference image features, which would cause incorrect matching (e.g. identical refrigerators or whole kitchens in near identical rooms of an apartment building or sister apartment buildings that are geographically dispersed). For the example of the environment 201, reference image features extracted from a reference image of the room 222 could be similar to reference image features extracted from another reference image of the room 221, as the room 222 and the room 221 may have similar decoration. Thus, determining a smaller and proper subset of the reference image features and matching the current image features with the subset of the reference image feature will improve the computational performance and matching accuracy.

In one embodiment, the proper subset of the reference image features could be determined from an initial pose of the user camera 602. For example, it is possible to define a field of view from the initial pose, and reference image features whose 3D positions are within the field of view or within a certain range beyond the field of view would be selected into the proper subset. In another example, it is possible to determine a neighbor region around the position defined by the initial pose. Reference image features having 3D positions within the neighbor region may be selected into the proper subset. In a further example, one or more reference images among the plurality of reference images could be chosen, if the reference camera poses of the one or more reference images are close (e.g. defined by thresholding or another approximation technique) to the initial pose. Reference image features extracted from the chosen reference images could be determined as the proper subset of the reference image features.

According to another embodiment, having an initial pose of the user camera 602, one or more reference images among the plurality of reference images could be chosen if the reference camera poses of the one or more reference images are close (e.g. defined by thresholding) to the initial pose. Photometric-based image matching may be performed to match the current image with at least one of the chosen reference images in order to estimate a transformation. The transformation could be a homography or a rigid 3D transformation. The final current camera pose could then be determined from the initial pose and the estimated transformation.

Determining an Initial Pose for the User Camera

Regarding semantics, in the following explanation, the environment property values contained in the environment property map may be called reference environment property values. Referring again to FIG. 1D, at process portion 107, a least one current environment property measurement is produced. The at least one current environment property measurement includes a measurement of an environment property. The at least one current environment property measurement could be obtained similarly as obtaining the at least one reference environment property measurement, described in step 103.

In one embodiment illustrated by FIG. 6, the user camera 602 may be associated with one or more current environment property measurements, such as environment property measurement 613. The environment property measurement 613 may be, for example, a measured WLAN signal strength, a measured time of travel of a Bluetooth signal, a measured altitude, a measured temperature, or any other property discussed or implied herein. In some embodiments, the measured property may be obtained from one or more sensors attached to the user camera 602 (e.g. integral with the camera). In addition, in some embodiments, the one or more sensors may measure environment signals sent from at least one of the signal-sensitive objects 211 through 215 to obtain the at least one current environment property measurement. In another embodiment, the one or more sensors may send one or more environment signals, and the one or more environment signals may be measured by at least one of the signal-sensitive objects 211 through 215 to obtain the at least one current environment property measurement.

As discussed above, the one or more sensors may also measure any environment data that is possible to measure at the time of the particular implementation. For example, the sensor may measure at least one of temperature, humidity, time, date, gravity, altitude above sea level, and earth magnetic field to obtain the at least one current environment property measurement. Furthermore, the time of measuring environment properties to obtain the at least one current environment property measurement may be recorded as a time data or a time parameter. The recorded time parameter may be associated with the at least one current environment property measurement. As discussed above, the time parameter may indicate any possible level of exactness or coarseness.

With reference again to FIG. 1D, at process portion 108, the current environment property measurement is matched against an environment property map. In particular, the at least one current environment property measurement may be matched against at least one reference environment property value contained in an environment property map. In some embodiments, multiple environment properties may be matched.

In some embodiments, properties from the current environment property measurement may only be compared against properties of a like type in the environment property map. For example, Bluetooth signal strength might only be compared against other data indicating Bluetooth signal strength. As another more particular example, the environment property measurement 613 (i.e. a current environment property measurement) may include a measured WLAN signal strength. The WLAN signal strength might, in some embodiments, only be compared with values of reference WLAN signal strengths of the environment property map.

Furthermore, according to one embodiment, comparing two environment property values (e.g. matching one current environment property measurement and one reference environment property value) involves determining a measurement difference between the two values. If the measurement difference between the two values is below a threshold, the two environment property values are matched; otherwise, they are not matched.

According to some embodiments, a time parameter may also be considered in matching properties. In particular, in order to more accurately match a signal (or other) property, the time of the measurement and reference information may also be compared. Thus, the time parameter associated with one current environment property measurement may be compared to a time parameter associated with one reference environment property value. Thus, in one or more embodiments, the time parameters are matched first (e.g. based on thresholding, or another known matching technique) so as to narrow the number of comparisons required regarding associated environment properties. For example, the universe of environment properties for comparison (i.e., reference environment property values for comparison with environment property measurements) may be greatly reduced by sorting out only those property values that have "matching" time values. After the universe of data is reduced by use of the time parameter matching, the actual determined reference environment property values may more efficiently be compared to the current environment property measurements.

In one example, temperature distribution patterns of the real environment 201 may be different in winter and summer. When the current environment property measurement of the environment temperature is made in winter, then reference environment property values related to winter contained in the environment property map should be selected to be matched against the current environment property measurement. Thus, in some embodiments, reference environment property values related to summer contained in the environment property map should not be selected to be compared and matched against the current environment property measurement.

In another example, light strength in the room 224 may be different in the morning and in the afternoon. Thus, in some embodiments, the current environment property measurement of light strength obtained in the morning should be matched to reference environment property values of light strength related to morning.

With reference again to FIG. 1D, at process position 109 an initial pose is determined based upon the matching performed with respect to process position 108. For example, one pair of a reference environment property value and a position contained in the environment property map may be matched to a current environment property measurement. The matching implies that the current position is associated with the reference position from the environment map. Depending upon the embodiment, the initial pose to be determined may indicate a position in 2D or 3D. For example, the 2D position would be a position on a plane, e.g. the earth plane, while the 3D position would be a position in 3D space. In addition, the initial pose to be determined may be very specific or any level of indication that is useful. For example, the initial position may indicate a region, and a region may define a space around or adjacent to a specific position. In some embodiments the region may be defined by distance (e.g. the space of 10 meters diameter around the specific position), while in other embodiments a region may represent a specific real environment space (e.g. a hallway, a building, a floor in a building or a room, such as the room 225). As discussed above, the initial pose to be determined may include any level of detail, such as position and orientation or any portion thereof.

Once a position is determined (e.g. as related to the matched reference environment property value contained in the environment property map), it may be used to determine the initial pose. According to one embodiment, the initial pose is determined to be the position of the matched reference environment property value. According to another embodiment, the initial pose is derived from the position of the matched reference environment property value. The derivation may be performed in any known manner and, in one embodiment, is derived as a function of the measurement difference between the matched reference environment property value and the at least one current environment property measurement. For example, the position of the matched reference environment property value may be modified according to the measurement difference and optionally according to the propagation property of the environment signal. The initial pose may then be determined to be the modified position. The propagation property may describe a relation between signal traveling time and distance. For instance, the relation could be linear or quadratic or otherwise functionally related. Thus, the relation may also be described by any mathematical equation.

In one example, multiple pairs of reference environment property values and positions contained in the environment property map are matched to the at least one current environment property measurement. According to one embodiment, the initial pose is determined to be an average, maximum, or minimum of the positions of the matched reference environment property values. For the determination of the average, the maximum, or the minimum, the positions contained in the environment property map may be weighted according to measurement differences between each of the matched reference environment property value and the at least one current environment property measurement, and optionally according to the propagation property of the environment signals.

With reference again to FIG. 1D, at process portion 110 a determination is made regarding a current pose for the user camera according to the initial pose, the current image, and at least part of the plurality of reference images. As discussed above, various techniques may be employed to determine the current pose for the user camera.

Online Tracking

Some embodiments of the disclosure contemplate online (as compared to offline) tracking of the user camera in the real environment (e.g. to determine subsequent camera poses of the user camera located at subsequent positions in the real environment). In contemplating this analysis, the user camera may be the same camera having different poses or it may be different cameras devices. For example, as shown in FIG. 6, at least one user camera may include the cameras 602 through 605, which may be the same camera device or different camera devices.

For purposes of the following discussion, the following semantics may be useful. The current image captured by the user camera at the first position at process portion 106 may be called the first current image. The current pose determined at process portion 110 may be called the first current camera pose. Contemplating a scenario in view of FIG. 6, the first current image may be captured by user camera 602 at the first current camera pose. A second current image may be captured by the user camera 603 at a second current camera pose. A third current image may be captured by the user camera 604 at a third current camera pose. According to one embodiment, the second current camera pose relative to the real environment is determined from the first current camera pose and a spatial relationship between the at least one user camera at the first position and at the second position.

In one implementation that accords with the foregoing embodiment, the spatial relationship between the camera 602 and the camera 603 may be determined from the image features extracted in the first current image and the second current image, e.g. based on SLAM. In another implementation that also accords with the foregoing embodiment, depth information may be captured by the cameras 602 and 603; then, the spatial relationship between the camera 602 and the camera 603 could be determined by aligning the depth information based on iterative closest points (ICPs) (or by any other known system for alignment). Moreover, many embodiments herein contemplate use of any technique disclosed herein or otherwise known for determining camera motion between different positions.

One technique contemplated by various embodiments of this disclosure might begin by acquiring an environment property measurement similar to the techniques discussed with respect to process portion 107. For example, one or more sensors may be attached to the user camera 603, and the one or more sensors may send environment signals or may measure environment properties. The environment property measurement may be used to obtain a subsequent initial pose for the user camera at the subsequent position indicated by 603. The subsequent initial pose may be used to determine, constraint, and/or improve the current camera pose.

According to one embodiment, current image features extracted in a first current image or the second current image may be added to the collection of reference image features. 3D positions of the current image features could be determined from the first or the second current camera poses. By this way, the completeness of the plurality of reference image features for the real environment could be improved.

Texture-Less Spots

Some embodiment contemplate that, in some cases, there do not exist significant features in one part of the real environment, and thus it may not be practical or even possible to extract image features from an image of that part of the real environment. For example, a white wall (or any uniform color) in the real environment may not provide any feature. Such parts of the real environment that do not provide extractable image features are called texture-less environments, and image regions containing texture-less environments are called texture-less image regions. Thus, it is technically difficult or impossible to perform image feature-based tracking or environment reconstruction in these regions.

As an exemplary scenario based upon FIG. 6, a camera pose of the camera 602 (i.e. a user camera) relative to the real environment 201 may be determined according to any solution disclosed above. The camera pose of the camera 603 may then be determined based upon the camera pose of the camera 602 and the motion or spatial difference between the camera 602 and the camera 603. The camera motion could be determined from image features extracted in the camera 602 and the camera 603. The camera motion could also be determined from depth information (e.g. by aligning the depth information) and/or from inertial sensors.

In one embodiment, assume the camera 605 captures a texture-less image of the wall. There may or may not be enough image features detected in the texture-less image of the wall. In one embodiment, whether there is "not enough" may be determined according to a threshold of a number of image features. For example, if the number of image features is less than a certain number (i.e. threshold), the image of the wall is determined to be texture-less. In this case, a camera motion between the camera 602 and the camera 605 could be determined from depth information and/or from inertial sensors. Thus, the camera pose of the camera 605 could still be determined from the camera motion and the camera pose of the camera 602. Having the camera pose of the camera 605, the position of the texture-less part (i.e. the wall or a part of the wall) in the real environment could be determined.

According to another embodiment, the environment property map may be created only once during an offline stage, and the determination of the current camera pose of a user camera could be performed online. Thus, the procedure of creating the environment property map and the procedure of determining the current camera pose could be separate. For example, with reference to FIG. 1D, the process portions 101 through 105 may be performed once to create the environment property map offline. The process portions 106 through 110 may be performed to determine the current camera pose of a user camera, and that determination may be made online. The process portions 106 through 110 may be performed multiple times to determine several current camera poses for several different user cameras. The process portions 106 through 110 may alternatively be performed just once to determine one current camera pose for one user camera.

Figure 7:
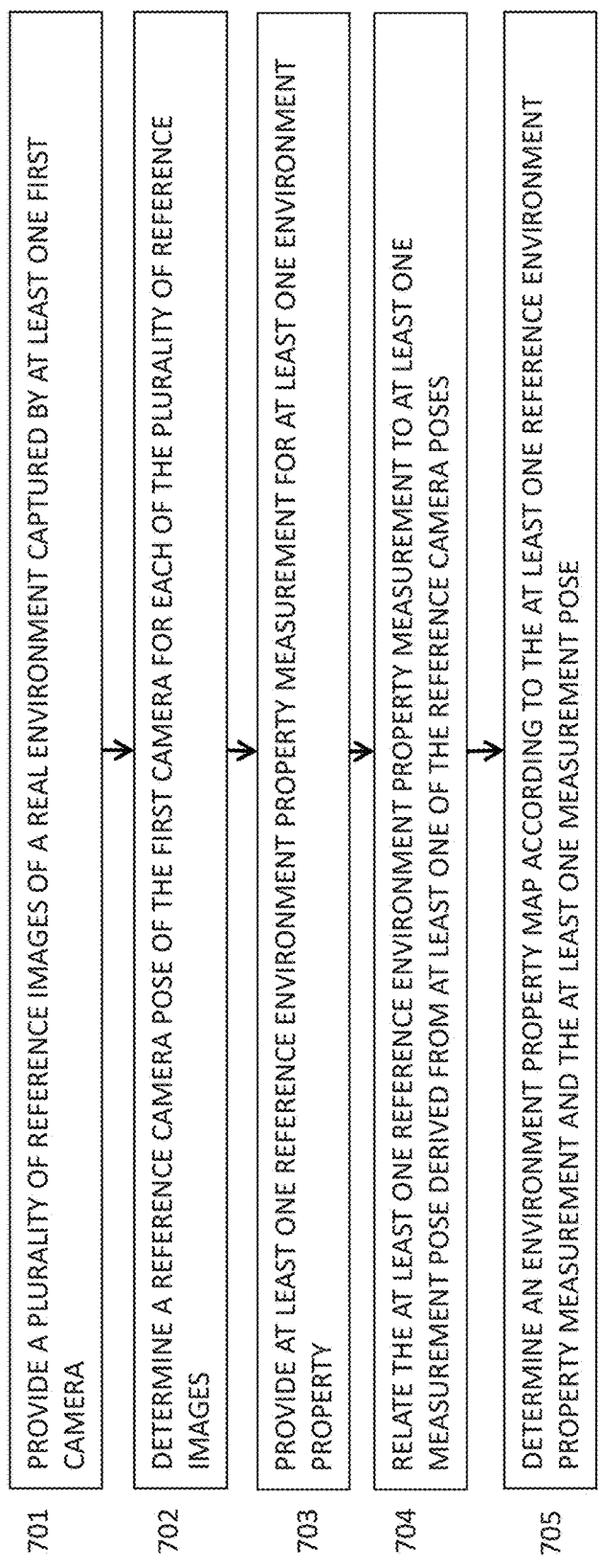
FIGS. 7 and 8 each illustrate a process associated with embodiments of the disclosure.

FIG. 7 shows a workflow diagram of one or more embodiments for determining an environment property map. At process portion 701, a plurality of reference images of a real environment are provided. The references images may be captured by a reference camera or by multiple reference cameras. Process portion 701 bears similarity to process portion 101 and thus, varying embodiments of the disclosure contemplate this process portion benefits from the teachings with respect to process portion 101. Moving to process portion 702, a determination is made regarding a reference camera pose of the reference camera for each of the plurality of reference images. Process portion 702 bears similarity to process portion 102 and thus, varying embodiments of the disclosure contemplate this process portion benefits from the teachings with respect to process portion 102. Next, at process portion 703, at least one reference environment property measurement is provided for at least one environment property. Process portion 703 bears similarity to process portion 103 and thus, varying embodiments of the disclosure contemplate this process portion benefits from the teachings with respect to process portion 103.

Still referring to FIG. 7, at process portion 704 at least one reference environment property measurement is associated with at least one measurement pose derived from at least one of the reference camera poses. The association may be recorded in a memory or database. Process portion 704 bears similarity to process portion 104 and thus, varying embodiments of the disclosure contemplate this process portion benefits from the teachings with respect to process portion 104. Finally, at process portion 705, an environment property map is determined, constructed or augmented. For example, a determination regarding an environment property map may be made according to the at least one reference environment property measurement and the at least one measurement pose. The environment property map may be embodied in hardware or software. Some particular embodiments place the environment property map in a database or specialized data structure suited for referencing. All embodiments, implementations and examples related to process portion 105 could also be applied to process portion 705.

Figure 8:
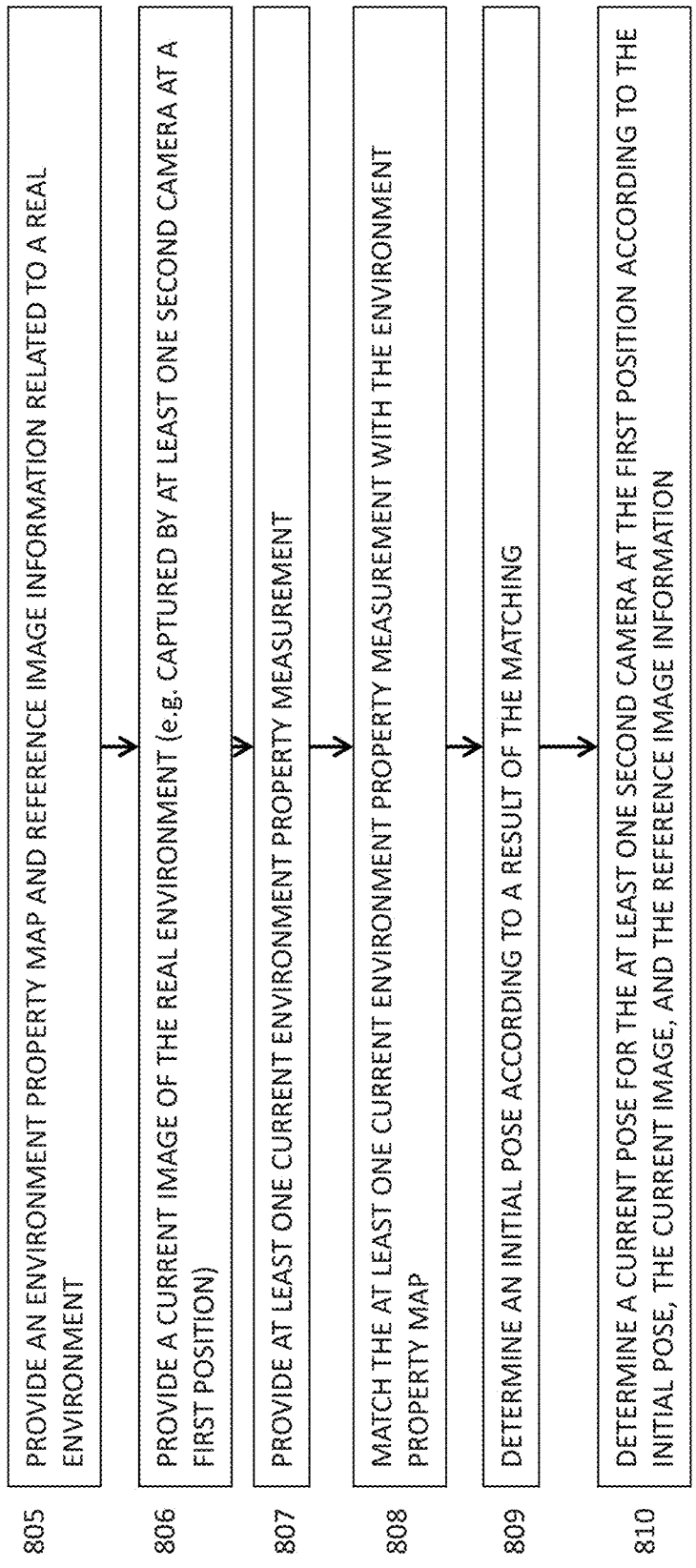

Referring now to FIG. 8, there is shown a process diagram for determining a current camera pose based on a provided environment property map. At process portion 805, an environment property map and reference image information related to a real environment are provided. The environment property map may be created based on embodiments disclosed above, for example with respect to those in FIG. 7. In one embodiment, the reference image information may include both: a plurality of reference images of the real environment; and, the reference camera poses where the reference images are captured by cameras. In another embodiment, the reference image information may include a set of reference image features with 3D positions. Theses reference image features may be extracted from images of the real environment.

Referring back to FIG. 8, at process portion 806 a current image of the real environment is provided, and in some embodiments the image is provided by a user camera that captured the image at a first position. Process portion 806 bears similarity to process portion 106 and thus, varying embodiments of the disclosure contemplate this process portion benefits from the teachings with respect to process portion 106. Next, at process portion 807 at least one current environment property measurement is provided and in some embodiments it is provided by a sensor attached to the user camera. Process portion 807 bears similarity to process portion 107 and thus, varying embodiments of the disclosure contemplate this process portion benefits from the teachings with respect to process portion 107. Moving further, at process portion 808, the at least one current environment property measurement is compared for matching with the environment property map. Process portion 808 bears similarity to process portion 108 and thus, varying embodiments of the disclosure contemplate this process portion benefits from the teachings with respect to process portion 108. Next, at process portion 809, an initial pose is determined according to a result of the comparing and matching. Process portion 809 bears similarity to process portion 109 and thus, varying embodiments of the disclosure contemplate this process portion benefits from the teachings with respect to process portion 109. Finally, at process portion 810, a current pose is determined for the user camera at the first position based upon one or more of the initial pose, the current image, and the reference image information. Process portion 810 bears similarity to process portion 110 and thus, varying embodiments of the disclosure contemplate this process portion benefits from the teachings with respect to process portion 110.

In one example of a system implementation, all the processes and techniques of determining a current camera pose disclosed herein could be performed by one computing device. For example, all of the process portions 101 through 110 shown in FIG. 1D may be performed by one computing device. In one embodiment, the one computing device may be a client device equipped with a client camera and potentially a series of sensors. A sample device of this type is described below. As discussed above, one or more reference cameras and one or more user cameras may be the same camera, which is the client camera. For example, the environment property map may be constructed with an iPad or iPhone, and then later used for navigation, augmented reality or virtual reality with the same iPad or iPhone.

In a sample implementation, a user may hold the client device and capture a plurality of reference images of a real environment by the client camera, while the user walks in the real environment. Further, a sensor may be attached to the client device to measure environment properties as reference environment property measurements. The creation of an environment property map may be performed by the client device according to any method disclosed herein. When the user comes to the real environment next time, the user could device for navigation in the real environment. The user could capture a current image of the real environment by the client camera. The sensor attached to the client device would provide at least one current environment property measurement. The determination of a current pose for the client camera may be performed by the client device according to any method disclosed herein or known hereafter. Similarly, the client device could capture a second current image and determine a second current camera pose.

Extending the sample implementation, the one computing device may include a server separate from the camera/sensor-bearing devices. The server may communicate with one or more client devices via cables or wirelessly. The one or more client devices may each include one or more client cameras, which may be employed as a reference camera or a user camera. The one or more client devices may also be equipped with sensors to measure environment properties. An embodiment of this type may be illustrated with respect to FIG. 3, which shows server 350 that may be the server of the sample implementation.

In one server-based embodiment, one or more users may use one or more client devices equipped both to capture a plurality of reference images of a real environment by the client cameras and to produce at least reference environment property measurements. A plurality of captured reference images and reference environment property measurements may be sent from the one or more client devices to the server. The data may be sent one-at-time or may be batched by the client device prior to sending. The creation of an environment property map may be performed by the server according to any method disclosed herein. Alternatively, the environment property map may be created or augmented (e.g. updated) in cooperation between the client devices and the servers. For example, the client devices may associate data (e.g. image with environment measurements), and the server may analyze the data as taught herein and construct or augment the map.

In another embodiment, a client device may be used to capture a current image and at least one current environment property measurement, which would then be sent from the client device to the server (either batched or one-at-a-time). The determination of a current pose for the client camera may be performed by the server or the client device. If the pose is determined by the server, it may be sent from the server to the client device according to any known technique.

In yet another implementation variation, all the process portions for determining a current camera pose discussed herein may be performed by several different computing devices. The computing devices may communicate with each other via cables or wirelessly. For example, the computing devices may include servers and client devices. A client device may be equipped with one or more cameras to capture images and sensors to provide environment property measurements. The process portions 101 through 105 shown in FIG. 1D or the process portions 701 through 705 shown in FIG. 7 may be performed by the server. In this case, the server may collect reference images and reference environment property measurements from one or more client devices as described above.

Finally, the process portions 106 through 110 shown in FIG. 1D or process portions 806 through 810 shown in FIG. 8 may be performed by a client device. In this case, the environment property map may be provided to the client device. When the environment property map is stored in the server, the environment property map may be sent from the server to the client device. Further, reference image information related to the real environment stored in the server may also have to be sent from the server to the client device. In one implementation, the reference image information may include a plurality of reference images of the real environment and the reference camera poses where the reference images are captured by cameras. In another implementation, the reference image information may include a set of reference image features with 3D positions. The reference image features may be extracted from images of the real environment.

The inventive embodiments described herein may have implication and use in and with respect to all types of devices, including single and multi-processor computing systems and vertical devices (e.g. cameras, phones or appliances) that incorporate single or multi-processing computing systems. The discussion herein references a common computing configuration having a CPU resource including one or more microprocessors. The discussion is only for illustration and is not intended to confine the application of the invention to the disclosed hardware. Other systems having other known or common hardware configurations (now or in the future) are fully contemplated and expected. With that caveat, a typical hardware and software operating environment is discussed below. The hardware configuration may be found, for example, in a server, a laptop, a tablet, a desktop computer, a phone, or any computing device, whether mobile or stationary.

Figure 9:
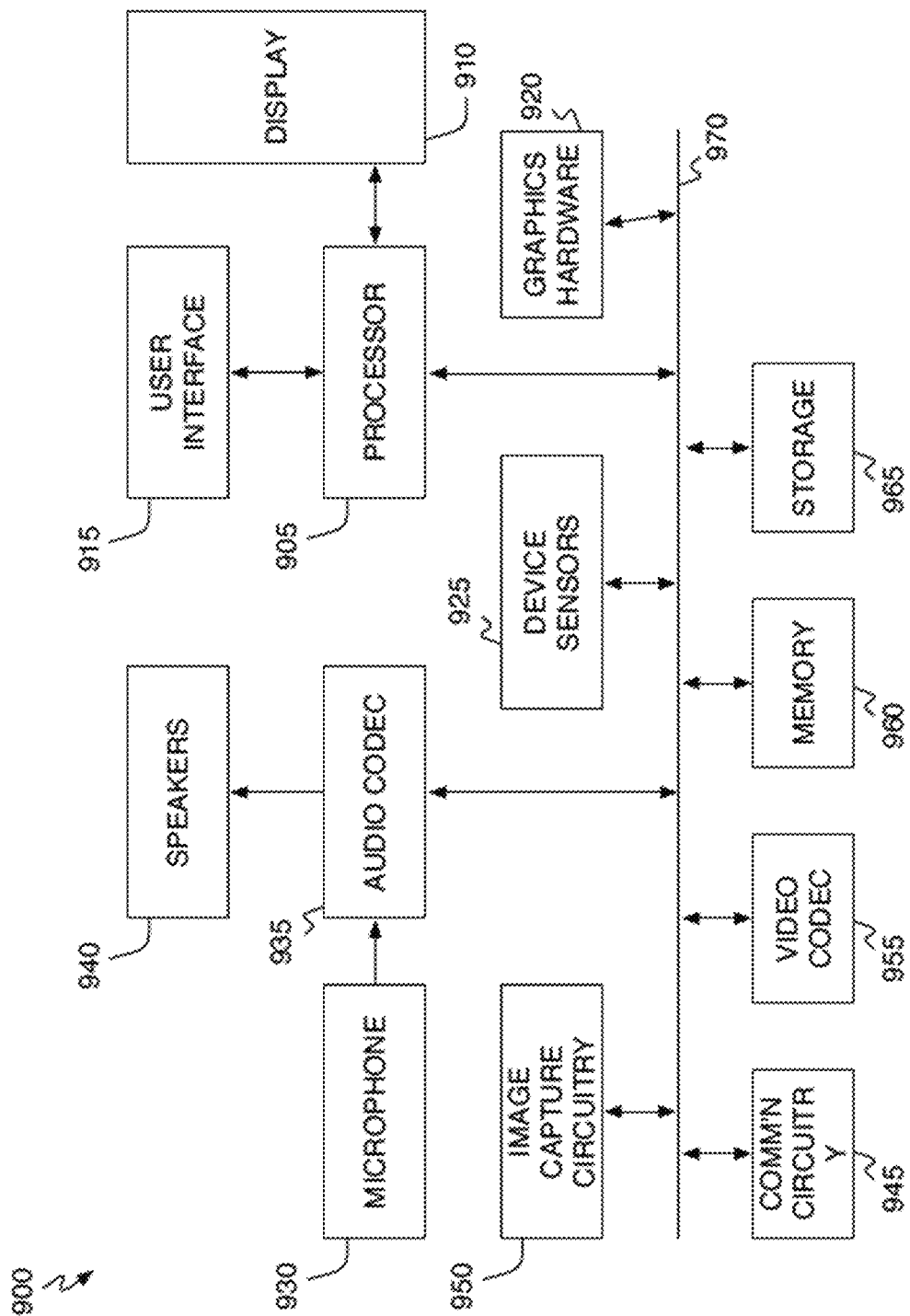
FIG. 9 shows exemplary hardware.

Referring to FIG. 9, a simplified functional block diagram of illustrative electronic device 900 is shown according to one embodiment. Electronic device 900 could be, for example, a mobile telephone, personal media device, portable camera, or a tablet, notebook or desktop computer system, a specialized mobile sensor device or even a server. As shown, electronic device 900 may include processor 905, display 910, user interface 915, graphics hardware 920, device sensors 925 (e.g. GPS, proximity sensor, ambient light sensor, accelerometer, magnetometer and/or gyroscope), microphone 930, audio codec(s) 935, speaker(s) 940, communications circuitry 945, image capture circuitry 950 (e.g. camera), video codec(s) 955, memory 960, storage 965 (e.g. hard drive(s), flash memory, optical memory, etc.) and communications bus 970. Communications circuitry 945 may include one or more chips or chip sets for enabling cell based communications (e.g. LTE, CDMA, GSM, HSDPA, etc.) or other communications (WiFi, Bluetooth, USB, Thunderbolt, Firewire, etc.). Electronic device 900 may be, for example, a personal digital assistant (PDA), personal music player, a mobile telephone, or a notebook, laptop, tablet computer system, a dedicated sensor and image capture device, or any desirable combination of the foregoing.

Processor 905 may execute instructions necessary to carry out or control the operation of many functions performed by device 900 (e.g. to run applications like games and agent or operating system software to observe and record the environment (e.g. electrometrically or otherwise), user behaviors (local or remote), and the context of those behaviors). In general, many of the functions described herein are based upon a microprocessor acting upon software (instructions) embodying the function. Processor 905 may, for instance, drive display 910 and receive user input from user interface 915. User interface 915 can take a variety of forms, such as a button, keypad, dial, a click wheel, keyboard, display screen and/or a touch screen, or even a microphone or camera (video and/or still) to capture and interpret input sound/voice or images including video. The user interface 915 may capture user input for any purpose including for use as an entertainment device, a communications device, a sensing device, an image capture device or any combination thereof.

Processor 905 may be a system-on-chip such as those found in mobile devices and may include a dedicated graphics processing unit (GPU). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 to process graphics information. In one embodiment, graphics hardware 920 may include one or more programmable graphics processing units (GPUs).

Sensors 925 and camera circuitry 950 may capture contextual and/or environmental phenomena such as the electromagnetic environment, location information, the status of the device with respect to light, gravity and the magnetic north, and even still and video images. All captured contextual and environmental phenomena may be used to contribute to determining device positioning as described above and throughout this disclosure. Output from the sensors 925 or camera circuitry 950 may be processed, at least in part, by video codec(s) 955 and/or processor 905 and/or graphics hardware 920, and/or a dedicated image processing unit incorporated within circuitry 950. Information so captured may be stored in memory 960 and/or storage 965 and/or in any storage accessible on an attached network. Memory 960 may include one or more different types of media used by processor 905, graphics hardware 920, and image capture circuitry 950 to perform device functions. For example, memory 960 may include memory cache, electrically erasable memory (e.g., flash), read-only memory (ROM), and/or random access memory (RAM). Storage 965 may store data such as media (e.g., audio, image and video files), computer program instructions, or other software including database applications, preference information, device profile information, and any other suitable data. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to retain computer program instructions or code organized into one or more modules in either compiled form or written in any desired computer programming language. When executed by, for example, processor 905, such computer program code may implement one or more of the acts or functions described herein, including all or part of the described processes.

Figure 10:
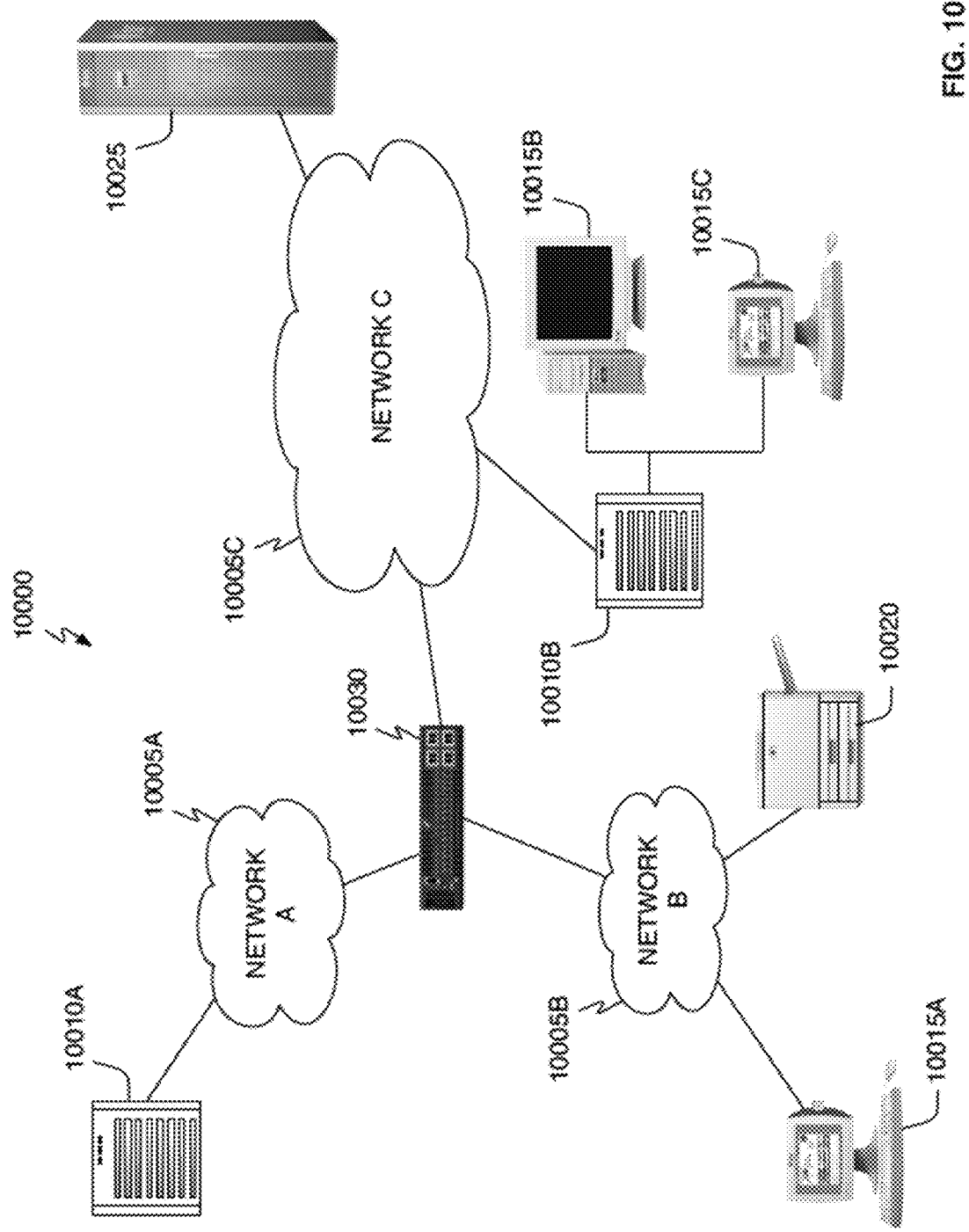
FIG. 10 shows exemplary networks.

Referring now to FIG. 10, illustrative network architecture 10000, within which the disclosed techniques may be implemented, includes a plurality of networks 10005, (i.e., 10005A, 10005B and 10005C), each of which may take any form including, but not limited to, a local area network (LAN) or a wide area network (WAN) such as the Internet. Further, networks 10005 may use any desired technology (wired, wireless, or a combination thereof) and protocol (e.g., transmission control protocol, TCP). Coupled to networks 10005 are data server computers 10010 (i.e., 10010A and 10010B) that are capable of operating server applications such as databases and are also capable of communicating over networks 10005. One embodiment using server computers may involve the operation of one or more central systems to collect, process, and distribute device environment and behavior, contextual information, images, or other information to and from other servers as well as mobile computing devices, such as smart phones or network connected tablets.

Also coupled to networks 10005, and/or data server computers 10010, are client computers 10015 (i.e., 10015A, 10015B and 10015C), which may take the form of any computer, set top box, entertainment device, communications device, or intelligent machine, including embedded systems. In some embodiments, users will employ client computers in the form of smart phones or tablets. Also, in some embodiments, network architecture 10010 may also include network printers such as printer 10020 and storage systems such as 10025, which may be used to store multimedia items (e.g., images) and environment property information that is referenced herein. To facilitate communication between different network devices (e.g., data servers 10010, end-user computers 10015, network printer 10020, and storage system 10025), at least one gateway or router 10030 may be optionally coupled there between. Furthermore, in order to facilitate such communication, each device employing the network may comprise a network adapter. For example, if an Ethernet network is desired for communication, each participating device must have an Ethernet adapter or embedded Ethernet-capable ICs. Further, the devices may carry network adapters for any network in which they will participate, including wired and wireless networks.

As noted above, embodiments of the inventions disclosed herein include software. As such, a general description of common computing software architecture is provided as expressed in the layer diagrams of FIG. 11. Like the hardware examples, the software architecture discussed here is not intended to be exclusive in any way but rather illustrative. This is especially true for layer-type diagrams, which software developers tend to express in somewhat differing ways. In this case, the description begins with layers starting with the O/S kernel, so lower level software and firmware have been omitted from the illustration but not from the intended embodiments. The notation employed here is generally intended to imply that software elements shown in a layer use resources from the layers below and provide services to layers above. However, in practice, all components of a particular software element may not behave entirely in that manner.

Figure 11:
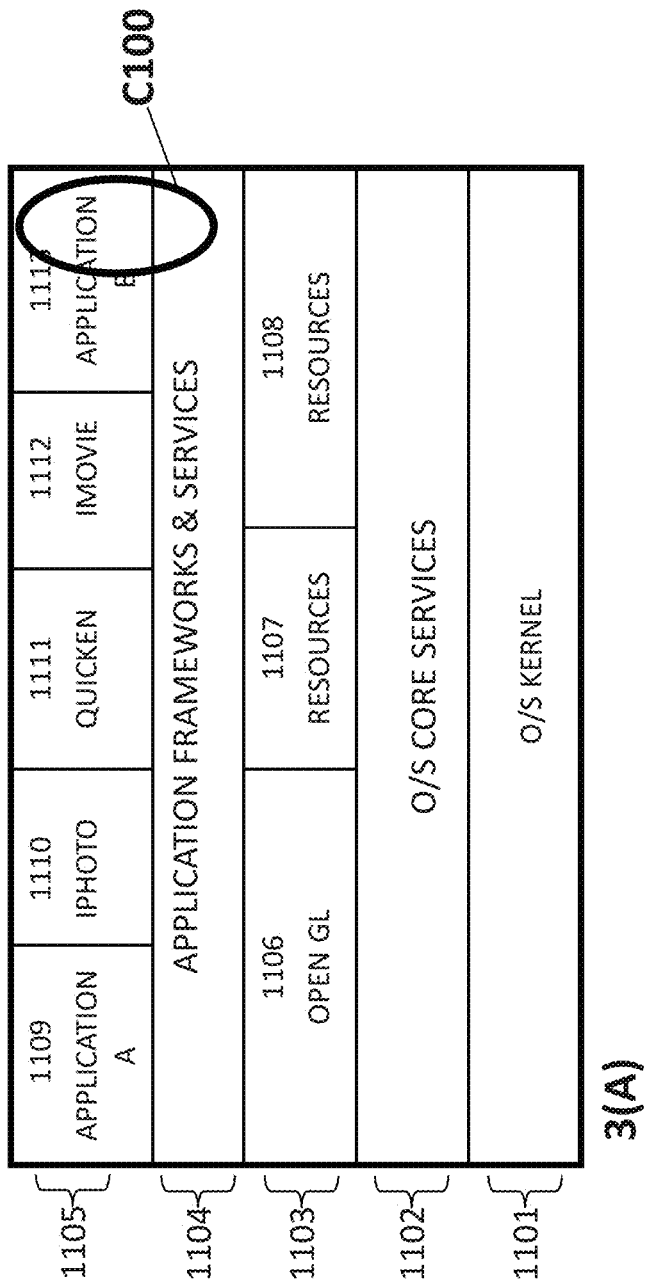
FIG. 11 shows exemplary software architecture.

With those caveats regarding software, referring to FIG. 11, layer 1101 is the O/S kernel, which provides core O/S functions in a protected environment. Above the O/S kernel is layer 1102 O/S core services, which extends functional services to the layers above, such as disk and communications access. Layer 1103 is inserted to show the general relative positioning of the Open GL library and similar application and framework resources. Layer 1104 is an amalgamation of functions typically expressed as multiple layers: applications frameworks and application services. For purposes of this discussion, these layers provide high-level and often functional support for application programs which reside in the highest layer shown here as item 1105. Item C100 is intended to show the general relative positioning of any client side agent software described for some of the embodiments of the current invention. In particular, in some embodiments, client-side software (or other software) that observes device environment and behaviors (including context) and the behavior of sensors may reside in the application layer and in frameworks below the application layer. In addition, some device behaviors may be expressed directly by a device user through a user interface (e.g. the response to a question or interface). Further, some device behaviors and environment may be monitored by the operating system, and embodiments of the invention herein contemplate enhancements to an operating system to observe and track more device behaviors and environment; such embodiments may use the operating system layers to observe and track these items. While the ingenuity of any particular software developer might place the functions of the software described at any place in the software stack, the software hereinafter described is generally envisioned as all of: (i) user facing, for example, to receive user input for set up, during creation of an environment property map and potentially during use of an environment property map; (ii) as a utility, or set of functions or utilities, beneath the application layer, for tracking and recording device behaviors and environment and for determining the position of the device or pose of a camera; and (iii) as one or more server applications for organizing, analyzing, and distributing position information and the underlying data. Furthermore, on the server side, certain embodiments described herein may be implemented using a combination of server application level software and database software, with either possibly including frameworks and a variety of resource modules.

No limitation is intended by these hardware and software descriptions and the varying embodiments of the inventions herein may include any manner of computing device such as Macs, PCs, PDAs, phones, servers, or even embedded systems, such as a dedicated device.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. As used in this disclosure, (i) the words "include" and "including" and variations thereof, will not be deemed to be terms of limitation, but rather will be deemed to be followed by the words "without limitation," and (ii) unless the context otherwise requires, the word "or" is intended as an inclusive "or" and shall have the meaning equivalent to "and/or." Furthermore, in the appended claims, the terms "including" and "in which" are used as the plain-English equivalents of the respective terms "comprising" and "wherein."

We claim:

1. A non-transitory computer readable medium comprising computer readable code executable by one or more processors to:
   capture sensor data, by one or more sensors of a system, related to one or more environment property values, wherein the one or more environment property values are obtained in an environment;
   perform, by the system, a matching operation by matching the sensor data to at least one of a plurality of reference environment property values of an environment property map, wherein each of the plurality of reference environment property values represents an environmental property of the environment at a corresponding position in the environment; and
   determine an initial position of the system in the environment in accordance with the matching operation.

2. The non-transitory computer readable medium of claim 1, further comprising computer readable code to:
   select a data set in accordance with the initial position of the system; and
   refine the initial position of the system based on the selected data set.

3. The non-transitory computer readable medium of claim 2, wherein refining the initial position of the system comprises utilizing a computer vision technique.

4. The non-transitory computer readable medium of claim 1, wherein the computer readable code to determine the initial position of the system further comprises computer readable code to:
   capture an image of the environment by a camera associated with the initial position of the system; and
   compare the image captured by the camera with at least one reference image associated with a reference position in the environment.

5. The non-transitory computer readable medium of claim 4, further comprising computer readable code to determine a pose of the camera based on the comparison of the image captured by the camera with the at least one reference image associated with the reference position in the environment.

6. The non-transitory computer readable medium of claim 1, wherein the environment property map comprises one or more environment property values associated with each of one or more locations in the environment.

7. The non-transitory computer readable medium of claim 1, wherein the one or more environment property values is captured by a sensor communicably coupled to the system.

8. A system comprising:
   one or more processors; and
   one or more computer readable media comprising computer readable code executable by the one or more processors to:
      capture sensor data, by one or more sensors of a system, related to one or more environment property values, wherein the one or more environment property values are obtained in an environment;
      perform, by the system, a matching operation by matching the sensor data to at least one of a plurality of reference environment property values of an environment property map, wherein each of the plurality of reference environment property values represents an environmental property of the environment at a corresponding position in the environment; and
      determine an initial position of the system in the environment in accordance with the matching operation.

9. The system of claim 8, further comprising computer readable code to:
   select a data set in accordance with the initial position of the system; and
   refine the initial position of the system based on the selected data set.

10. The system of claim 9, wherein refining the initial position of the system comprises utilizing a computer vision technique.

11. The system of claim 8, wherein the computer readable code to determine the initial position of the system further comprises computer readable code to:
   capture an image of the environment by a camera associated with the initial position of the system; and
   compare the image captured by the camera with at least one reference image associated with a reference position in the environment.

12. The system of claim 11, further comprising computer readable code to determine a pose of the camera based on the comparison of the image captured by the camera with the at least one reference image associated with the reference position in the environment.

13. The system of claim 8, wherein the environment property map comprises one or more environment property values associated with each of one or more locations in the environment.

14. The system of claim 8, wherein the one or more environment property values is captured by a sensor communicably coupled to the system.

15. A method, comprising:
capture sensor data, by one or more sensors of a system, related to one or more environment property values, wherein the one or more environment property values are obtained in an environment;
performing, by the system, a matching operation by matching the sensor data to at least one of a plurality of reference environment property values of an environment property map, wherein each of the plurality of reference environment property values represents an environmental property of the environment at a corresponding position in the environment; and
determining an initial camera position of the system in the environment in accordance with the matching operation.

16. The method of claim 15, further comprising:
selecting a data set in accordance with the initial position of the system; and
refining the initial position of the system based on the selected data set.

17. The method of claim 16, wherein refining the initial position of the system comprises utilizing a computer vision technique.

18. The method of claim 15, wherein determining the initial position of the system further comprises:
capturing an image of the environment by a camera associated with the initial position of the system; and
comparing the image captured by the camera with at least one reference image associated with a reference position in the environment.

19. The method of claim 18, further comprising determining a pose of the camera based on the comparison of the image captured by the camera with the at least one reference image associated with the reference position in the environment.

20. The method of claim 15, wherein the environment property map comprises one or more environment property values associated with each of one or more locations in the environment.

* * * * *